United States Patent
Wee et al.

(12)

(10) Patent No.: US 12,368,491 B2
(45) Date of Patent: Jul. 22, 2025

(54) COMMUNICATION DEVICE AND COMMUNICATION METHOD

(71) Applicant: Panasonic Intellectual Property Management Co., Ltd., Osaka (JP)

(72) Inventors: Yao Huang Gaius Wee, Singapore (SG); Hiroyuki Motozuka, Kanagawa (JP); Takenori Sakamoto, Kanagawa (JP); Masataka Irie, Kanagawa (JP); Hong Cheng Michael Sim, Singapore (SG)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 448 days.

(21) Appl. No.: 17/950,910

(22) Filed: Sep. 22, 2022

(65) Prior Publication Data

US 2023/0017996 A1    Jan. 19, 2023

Related U.S. Application Data

(63) Continuation of application No. PCT/JP2021/009877, filed on Mar. 11, 2021.

(30) Foreign Application Priority Data

Mar. 27, 2020   (JP) .................................. 2020-058830

(51) Int. Cl.
*H04W 48/08* (2009.01)
*H04B 7/06* (2006.01)
*H04L 5/00* (2006.01)

(52) U.S. Cl.
CPC .......... *H04W 48/08* (2013.01); *H04B 7/0639* (2013.01); *H04L 5/0048* (2013.01)

(58) Field of Classification Search
CPC ..... H04W 48/08; H04B 7/0639; H04L 5/0048
See application file for complete search history.

(56) References Cited

U.S. PATENT DOCUMENTS

2017/0099648 A1* 4/2017 Malik .................... H04W 64/00
2017/0302349 A1* 10/2017 Sun ....................... H04B 7/0695
(Continued)

FOREIGN PATENT DOCUMENTS

JP         2018093482 A * 6/2018 ........... H04B 7/0404

OTHER PUBLICATIONS

On the Performance of IEEE 802.11p Outside the Context of a BSS Networks (Year: 2018).*
(Continued)

*Primary Examiner* — Asad M Nawaz
*Assistant Examiner* — Hugh Mark Ashley
(74) *Attorney, Agent, or Firm* — Seed IP Law Group LLP

(57) ABSTRACT

A communication apparatus includes: MAC control circuitry, which, in operation, controls transmission and reception of a control frame and a data frame that are used for communication with another communication apparatus; and radio circuitry, which, in operation, performs radio communication of the control frame and the data frame using a transmission antenna and a reception antenna, wherein, when the radio circuitry receives, from the another communication apparatus, an SSW frame including an OCB response subfield among a plurality of the control frames, the MAC control circuitry determines whether to perform data communication between the communication apparatus and the another communication apparatus in accordance with the OCB response subfield.

8 Claims, 29 Drawing Sheets

(56) References Cited

U.S. PATENT DOCUMENTS

| | | | | |
|---|---|---|---|---|
| 2019/0052327 | A1* | 2/2019 | Motozuka | H04B 7/0617 |
| 2020/0008095 | A1* | 1/2020 | Patil | H04W 12/03 |
| 2020/0015043 | A1* | 1/2020 | Patil | H04W 4/06 |
| 2020/0204975 | A1* | 6/2020 | Abouelseoud | H04W 16/28 |
| 2022/0210829 | A1* | 6/2022 | Kim | H04W 4/40 |
| 2022/0408506 | A1* | 12/2022 | Kim | H04W 28/20 |

OTHER PUBLICATIONS

English Translation of Chinese Search Report, dated Nov. 22, 2024, for Chinese Patent Application No. 202180019686.7. (3 pages).

Motozuka et al., "OCB for 60 GHz V2X," doc.: IEEE 802.11-19-1162/r0, Jul. 2019, (12 pages).

International Search Report, mailed Jun. 15, 2021, for International Patent Application No. PCT/JP2021/009877. (6 pages) (with English translation).

IEEE Computer Society, "IEEE Standard for Information Technology—Telecommunications and information exchange between systems Local and metropolitan area networks—Specific requirements, Part 11: Wireless LAN Medium Access Control (MAC) and Physical Layer (PHY) Specifications, Amendment 3: Enhancements for Very High Throughput in the 60 GHz Band," IEEE Standards Association, IEEE Std 802.11ad™-2012, Dec. 28, 2012. (31 pages).

IEEE Vehicular Technology Society, "IEEE Standard for Wireless Access in Vehicular Environments (WAVE)—Networking Services," IEEE Standards Association, IEEE Std 1609.3™-2016. (11 pages).

* cited by examiner

BSS Type Subfield Values

| Subfield value | Responding STA role | Applicable BSS types |
|---|---|---|
| 3 | AP | Infrastructure BSS |
| 2 | PCP | PBSS |
| 1 | Non-AP STA | PBSS, IBSS, OCB |
| 0 | Any | Infrastructure BSS, PBSS, IBSS, OCB |

FIG. 7B

| Short sector sweep packet payload | Packet Type | Direction | OCB Response | Source AID | Destination AID | CDOWN | RF Chain ID | Short SSW Feedback | FCS |
|---|---|---|---|---|---|---|---|---|---|
| Bits: | 1 | 1 | 1 | 8 | 8 | 11 | 3 | 11 | 4 |

FIG. 8B

COMMUNICATION DEVICE AND COMMUNICATION METHOD

TECHNICAL FIELD

The present disclosure relates to a communication apparatus and a communication method.

BACKGROUND ART

Studies have been carried out on a scheme for performing high-speed communication with low latency using a broader frequency band in a carrier frequency of 10 GHz or higher. In a frequency band of 10 GHz or higher, the wavelength is shorter and this allows an antenna to be smaller. To make the most of the benefit and to extend the communication distance while avoiding great propagation loss, for example, studies have been carried out on a beamforming technique using an antenna with high directivity that is electrically controllable.

The IEEE 802.11ad-2012 standard (Non Patent Literature, which is hereinafter referred to as NPL, 1) is a standard for millimeter-wave wireless LAN communication using a 60 GHz band. A beamforming protocol is defined in the IEEE 802.11ad-2012 standard.

CITATION LIST

Non Patent Literature

NPL 1
IEEE 802.11ad-2012
NPL 2
IEEE 1609.3-2016

SUMMARY OF INVENTION

Technical Problem

The IEEE 802.11ad-2012 standard defines a radio communication scheme assuming a fixed radio device and a radio device carried at approximately the moving speed of pedestrians, and does not assume millimeter-wave communication using a radio device mounted on a high-speed moving body such as a car or train, for example.

One non-limiting and exemplary embodiment facilitates providing a communication apparatus mounted on a high-speed moving body to perform millimeter-wave communication and a communication method therefor.

Solution to Problem

A terminal according to an embodiment of the present disclosure includes: media access control (MAC) control circuitry, which, in operation, controls transmission and reception of a control frame and a data frame that are used for communication with another communication apparatus; and radio circuitry, which, in operation, performs radio communication of the control frame and the data frame using a transmission antenna and a reception antenna, wherein, when the radio circuitry receives, from the another communication apparatus, a sector sweep (SSW) frame including an outside a context of a BSS (OCB) response subfield among a plurality of the control frames, the MAC control circuitry determines whether to perform data communication between the communication apparatus and the another communication apparatus in accordance with the OCB response subfield.

It should be noted that general or specific embodiments may be implemented as a system, an apparatus, a method, an integrated circuit, a computer program, a storage medium, or any selective combination thereof.

Advantageous Effects of Invention

According to an exemplary embodiment of the present disclosure, it is possible to perform millimeter-wave communication using a communication apparatus mounted on a high-speed moving body.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 7B illustrates exemplary BSS type subfield values and the description according to Embodiment 1;

FIG. 8B illustrates an exemplary format of a short SSW packet payload according to Embodiment 1;

DESCRIPTION OF EMBODIMENTS

Figure 1A:
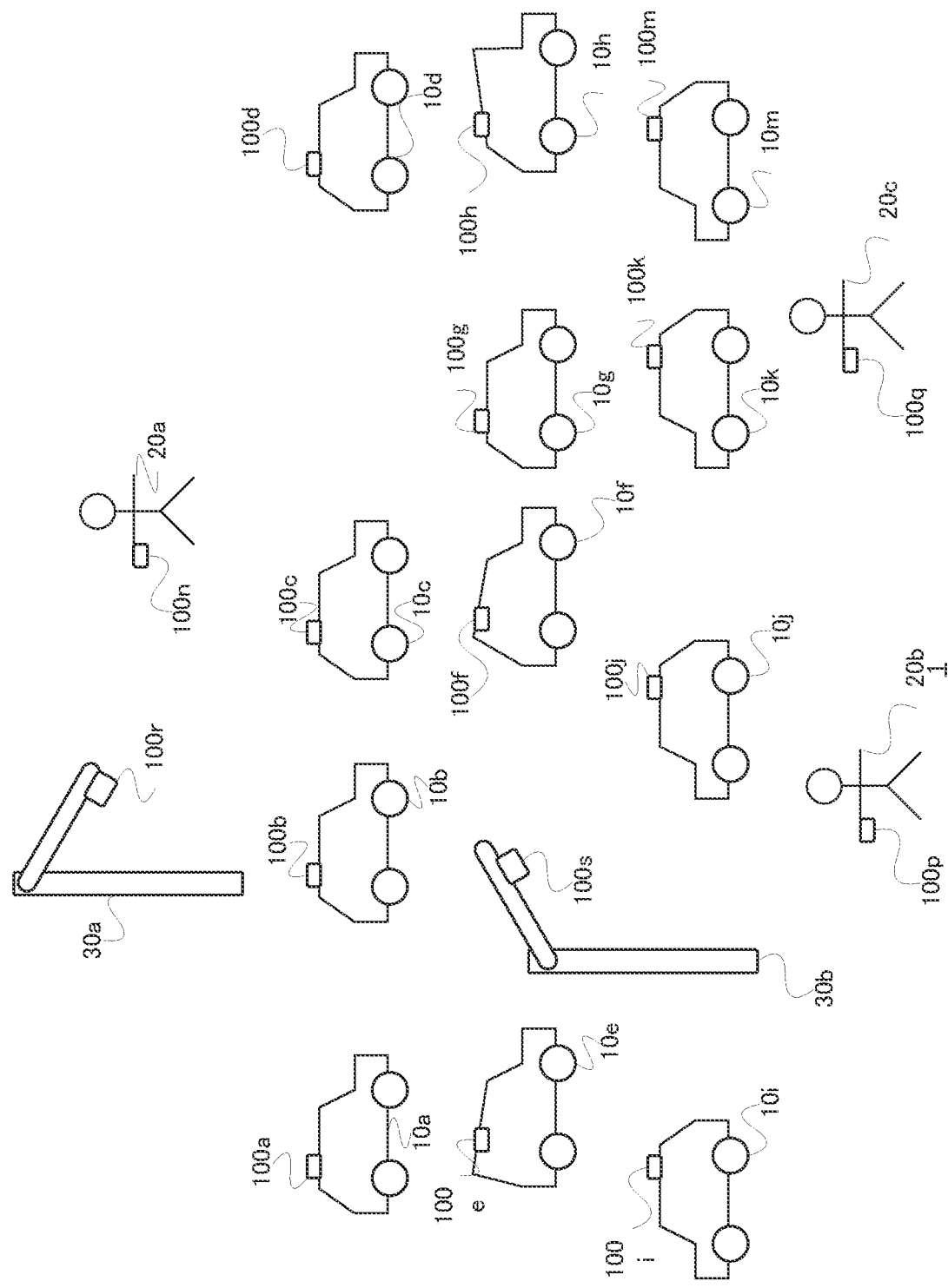
FIG. 1A illustrates an exemplary system configuration of a V2X communication system according to Embodiment 1.

Hereinafter, embodiments of the present invention will be described in detail with reference to the drawings as appropriate. Note that a detailed description more than necessary may be omitted, such as a detailed description of a well-known matter and a duplicate description for a substantially identical configuration, to avoid unnecessary redundancy of the following description and to facilitate understanding by a person skilled in the art.

Note that, the accompanying drawings and the following description are provided for the person skilled in the art to sufficiently understand the present disclosure, and are not intended to limit the subject matter described in the claims.

Common components in the drawings are denoted by the same reference signs. In addition, reference signs such as "vehicle 10A" and "vehicle 10B" are sometimes used for description distinguishing elements of the same type, and a common number of the reference signs such as "vehicle 10" is sometimes used for description without distinguishing elements of the same type. Note that the "vehicle" may also be referred to as a "moving body" or "mobility".

Embodiment 1

FIG. 1A illustrates an exemplary system configuration of vehicle-to-everything (V2X) communication system 1.

In communication system 1, vehicles 10 (10a, 10b, 10c, 10d, 10e, 10f, 10g, 10h, 10i, 10j, 10k, and 10m) respectively include communication apparatuses 100 (100a, 100b, 100c, 100d, 100e, 100f, 100g, 100h, 100i, 100j, 100k, and 100m). Pedestrians 20 (20a, 20b, and 20c) respectively have communication apparatuses 100 (100n, 100p, and 100q). Roadside units 30 (30a and 30b) respectively include communication apparatuses 100 (100r and 100s).

Note that each of vehicles 10, pedestrians 20, and roadside units 30 may include a plurality of communication apparatuses 100.

Communication apparatus 100 has a communication function compliant with a millimeter-wave communication scheme. Communication apparatus 100 may comply with the IEEE 802.11ad standard, IEEE 802.11-2016 standard, IEEE 802.11ay standard (draft), IEEE 802.11bd standard (draft), IEEE 802.15.3c standard, IEEE 802.15.3e standard, and/or 3GPP New Radio (NR) scheme.

Figure 1B:
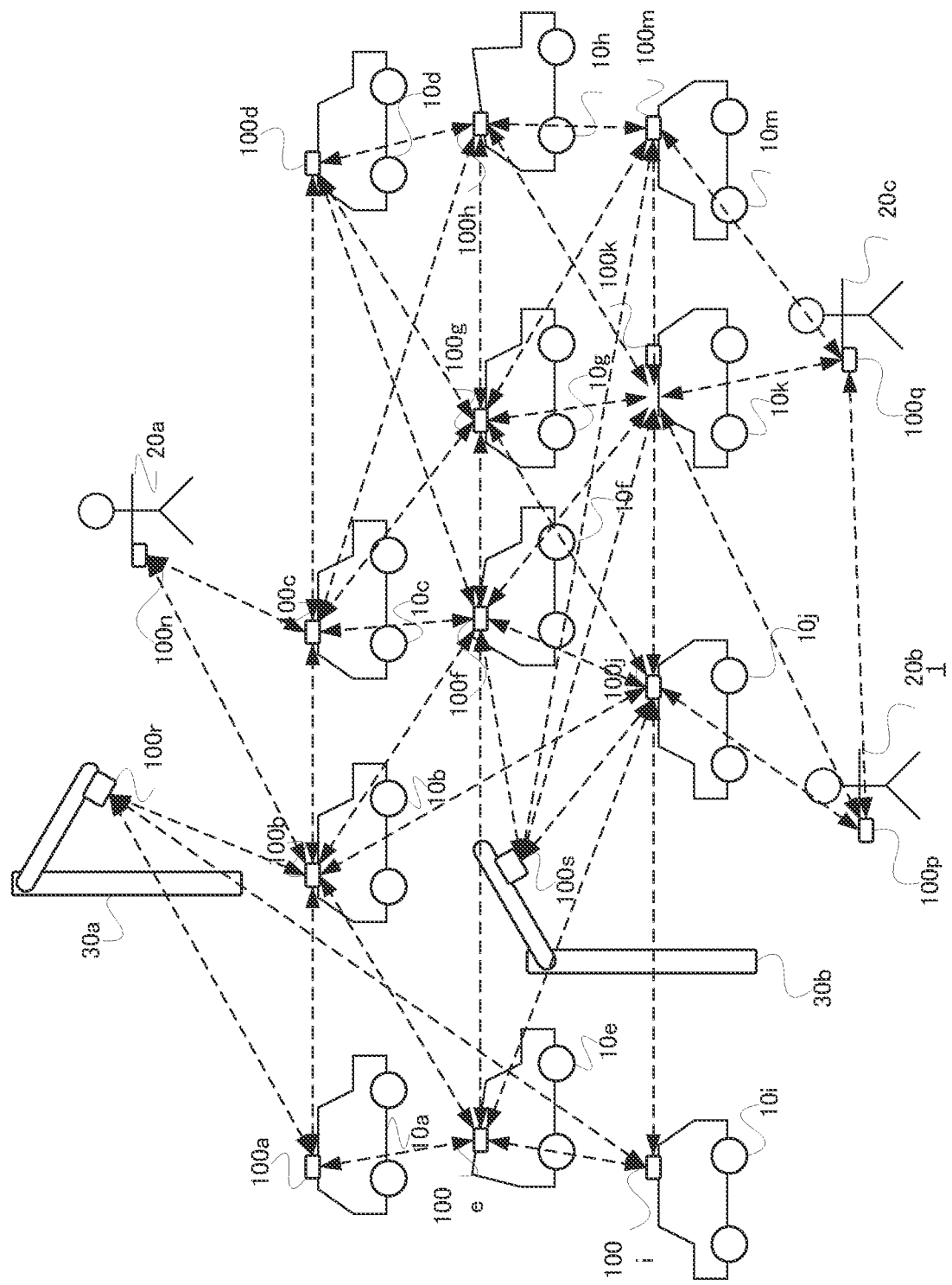
FIG. 1B illustrates exemplary radio links between communication apparatuses in the V2X communication system according to Embodiment 1.

FIG. 1B illustrates exemplary radio links between communication apparatuses in the V2X communication system according to Embodiment 1. FIG. 1B illustrates exemplary radio links between communication apparatuses 100 in communication system 1. The broken line arrows between communication apparatuses 100 each represent the radio link. By way of example, communication apparatus 100a has radio links with (i.e., can mutually communicate with) communication apparatuses 100b, 100e, and 100r, but has no radio link with communication apparatus 100c in some cases, for example. For example, sometimes no link is established between communication apparatuses 100 due to a long distance between communication apparatuses 100 or an obstruction such as another car between the communication apparatuses. As illustrated in FIG. 1B, in communication system 1 performing the V2X communication, each of the plurality of communication apparatuses 100 has one or more radio links, and when vehicle 10 and pedestrian 20 move, the presence or absence of the radio links and the quality of the radio links between the plurality of communication apparatuses 100 are changed.

Figure 2:
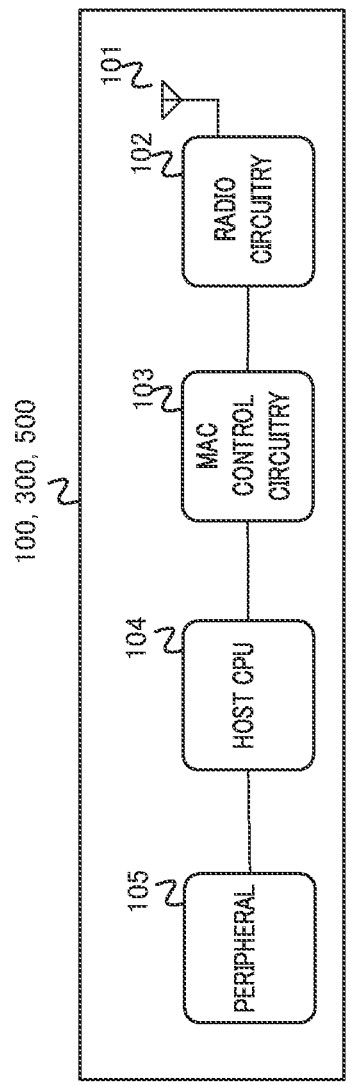
FIG. 2 illustrates an exemplary configuration of a communication apparatus compliant with the IEEE 802.11ad standard.

FIG. 2 illustrates an exemplary configuration of a communication apparatus compliant with the IEEE 802.11ad standard. FIG. 2 illustrates a configuration of communication apparatus 100. Communication apparatus 100 includes antenna 101, radio circuitry 102, media access control (MAC) control circuitry 103, host central processing unit (CPU) 104, and peripheral 105. Note that host CPU 104 and MAC control circuitry 103 may be collectively referred to as "control circuitry".

Antenna 101 may include one or more antenna elements. Antenna 101 may be, for example, a phased array antenna or an array antenna. A transmission antenna and reception antenna may be provided separately or shared. Antenna 101 may have a function of switching antenna directivity (e.g., referred to as a beam steering function or beamforming function). A process of selecting directivity for performing good-quality communication with a communication apparatus of a communication counterpart is referred to as beamforming training.

Radio circuitry 102 includes radio frequency (RF) circuitry and physical layer (PHY) control circuitry, and controls transmission and reception of packets defined in the IEEE 802 11ad standard, for example. Radio circuitry 102 is sometimes referred to as a transceiver.

MAC control circuitry 103 controls transmission and reception of a MAC frame (control frame) defined in the IEEE 802.11ad standard, for example. MAC control circuitry 103 also controls radio circuitry 102, and controls, for example, a procedure for finding a communication apparatus of a communication counterpart (referred to as discovery or scanning), a beamforming training procedure, and a request to send/clear to send (RTS/CTS) procedure.

Host CPU 104 controls MAC control circuitry 103 and runs, for example, a device driver and supplicant software. Host CPU 104 also runs an operating system (OS) and application software.

Peripheral 105 is connected to host CPU 104 and utilized by host CPU 104 to run software, and may include, for example, a hard disk drive (HDD), solid state drive (SSD), network expansion device such as an Ethernet (registered trademark) controller Ethernet board, and a peripheral used for global navigation satellite system (GNSS) application software.

Figure 3A:
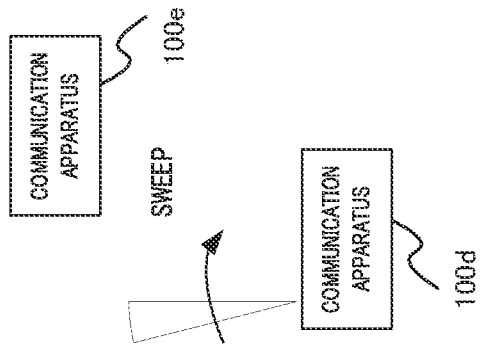
FIG. 3A illustrates an exemplary procedure for establishing communication links by the communication apparatuses compliant with the IEEE 802.11ad standard.
Figure 3A:
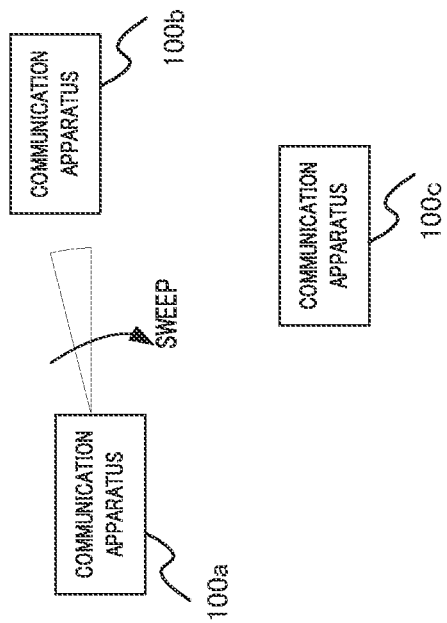
Figure 3B:
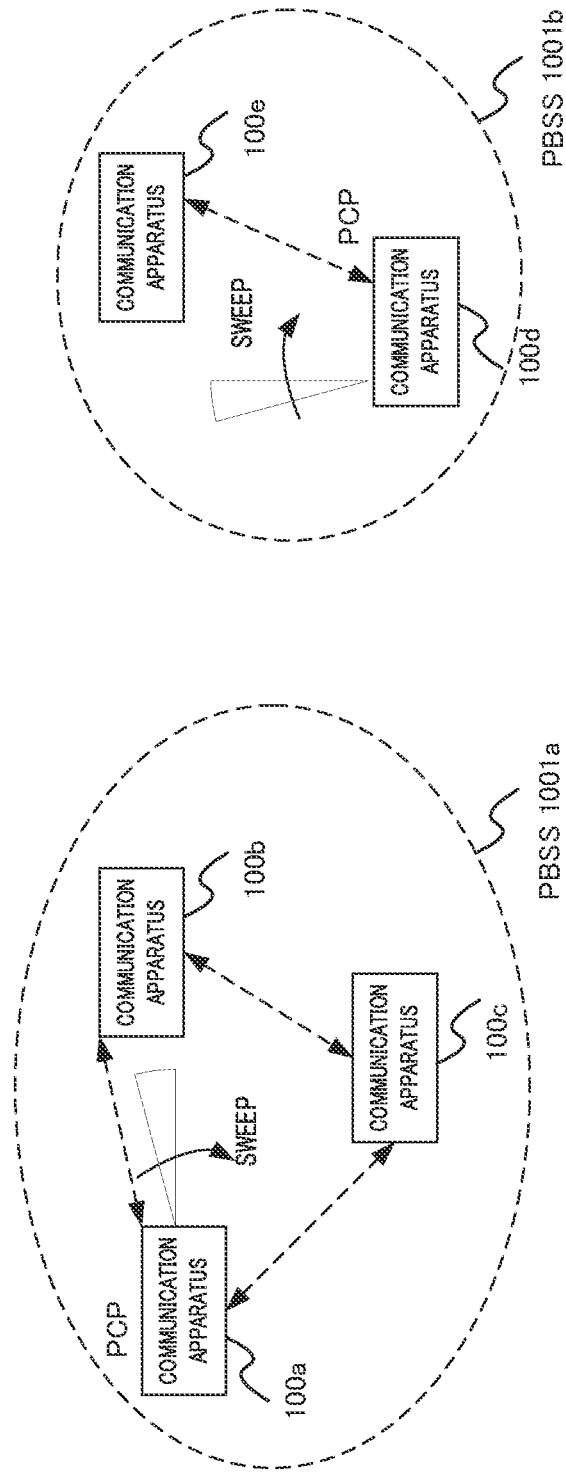
FIG. 3B illustrates another exemplary procedure for establishing communication links by the communication apparatuses compliant with the IEEE 802.11ad standard.
Figure 3C:
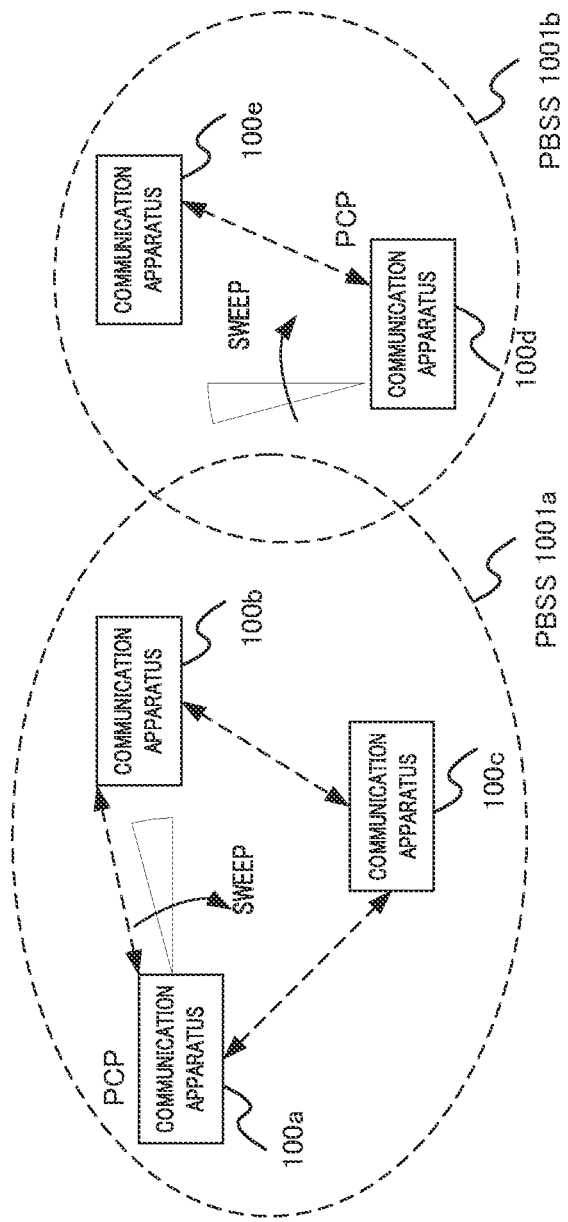
FIG. 3C illustrates still another exemplary procedure for establishing communication links among the communication apparatuses compliant with the IEEE 802.11ad standard.

Next, descriptions will be given of methods of establishing communication links by communication apparatuses 100a, 100b, 100c, 100d, and 100e compliant with the IEEE 802.11ad standard. FIG. 3A illustrates an exemplary procedure for establishing communication links by the communication apparatuses compliant with the IEEE 802.11ad standard. FIG. 3B illustrates another exemplary procedure for establishing communication links by the communication apparatuses compliant with the IEEE 802.11ad standard. FIG. 3C illustrates still another exemplary procedure for establishing communication links among the communication apparatuses compliant with the IEEE 802.11ad standard.

In FIG. 3A, communication apparatus 100a transmits a plurality of directional multi gigabit (DMG) beacon frames with the values of discovery mode (DM) subfields set to 1 (flagged) while changing the antenna directivity of antenna 101. Communication apparatus 100d also transmits a plurality of DMG beacon frames while changing the antenna directivity of antenna 101.

When communication apparatuses 100b and 100c respond to the DMG beacon frames transmitted by communication apparatus 100a in FIG. 3B, communication apparatus 100a performs an association procedure with respect to communication apparatuses 100b and 100c and initiates personal basic service set (PBSS) 1001a. Communication apparatus 100a becomes a PBSS control point (PCP) and schedules PBSS 1001a.

Communication apparatus 100b transmits a plurality of DMG beacon frames with the values of discovery mode subfields set to 1 while changing the antenna directivity of antenna 101, and recognizes that communication apparatus 100c is participating in PBSS 1001a when communication apparatus 100c responds to the DMG beacon frame.

Each of communication apparatuses 100a, 100b, and 100c determines whether it is possible to perform data communication and/or whether it is possible to perform beamforming training according to scheduling information indicated by communication apparatus 100a, and performs mutual communication with communication apparatuses 100 participating in PBSS 1001a.

Likewise, communication apparatus 100d transmits a plurality of DMG beacon frames with the values of discovery mode subfields set to 1, and when responded communication apparatus 100e does not participate in any PBSS, communication apparatus 100d initiates PBSS 1001b with communication apparatus 100d as the PCP and performs mutual communication with communication apparatus 100 (100e) participating in PBSS 1001b.

Note that, although communication apparatuses 100a and 100d from which the DMG beacon is transmitted are selected as the PCPs in FIG. 3B, another communication apparatus 100 may be selected as the PCP. By way of example, communication apparatus 100b or communication apparatus 100c may be the PCP of PBSS 1001a, and communication apparatus 100e may be the PCP of PBSS 1001b.

In FIG. 3C, in a case where vehicle 10d (not illustrated) with communication apparatus 100d moves and approaches a communication range with communication apparatus 100b and 100c, communication apparatuses 100b and 100c respond to the DMG beacons transmitted by communication apparatus 100d, but need not participate in PBSS 1001b since communication apparatuses 100b and 100c have already participated in PBSS 1001a. In this case, it is difficult for communication apparatuses 100b and 100c to mutually communicate with communication apparatus 100d.

Figure 4:
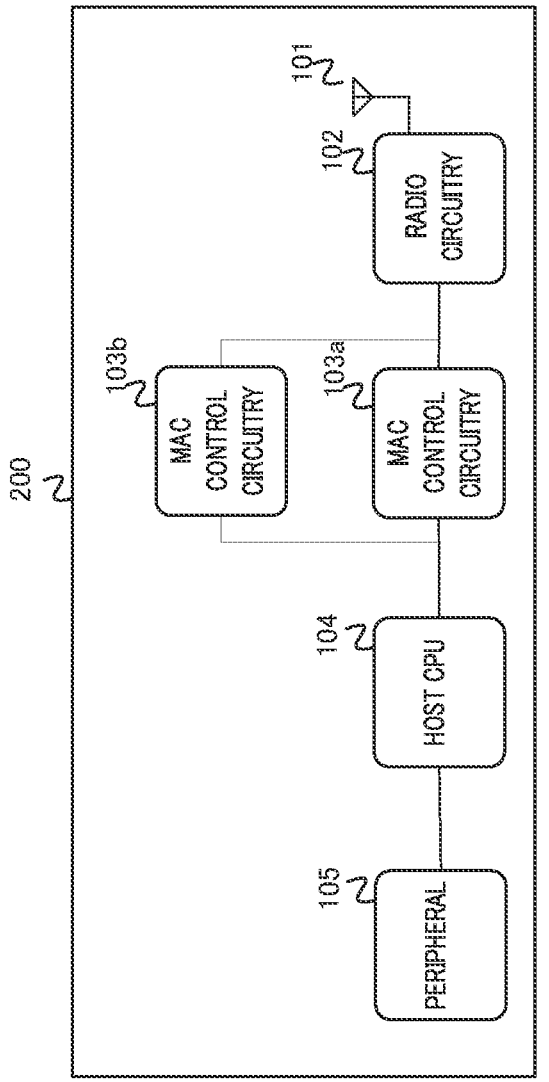
FIG. 4 illustrates an exemplary configuration of a communication apparatus according to Embodiment 1.

FIG. 4 illustrates another exemplary configuration of the communication apparatus. FIG. 4 illustrates an exemplary configuration of communication apparatus 200 for mutual communication between communication apparatuses 100b and 100c and communication apparatus 100d in a situation as in FIG. 3C. Communication apparatus 200 includes a plurality of pieces of MAC control circuitry 103. By way of example, communication apparatus 200 in FIG. 4 includes two pieces of MAC control circuitry 103a and 103b.

MAC control circuitry 103a and 103b may be configured by including two pieces of MAC control circuitry 103 in FIG. 2, or alternatively, MAC control circuitry 103a and 103b may be configured by using software in which a single piece of circuitry has a function equivalent to two pieces of MAC control circuitry 103. For example, a CPU (not illustrated), digital signal processor (DSP: not illustrated), field programmable gate array (FPGA: not illustrated), and application specific integrated circuit (ASIC: not illustrated) included in MAC control circuitry 103 in FIG. 2 may be configured to perform improved processing performance so as to have a function pseudo-equivalent to two pieces of MAC control circuitry 103a and 103b by software.

Figure 5:
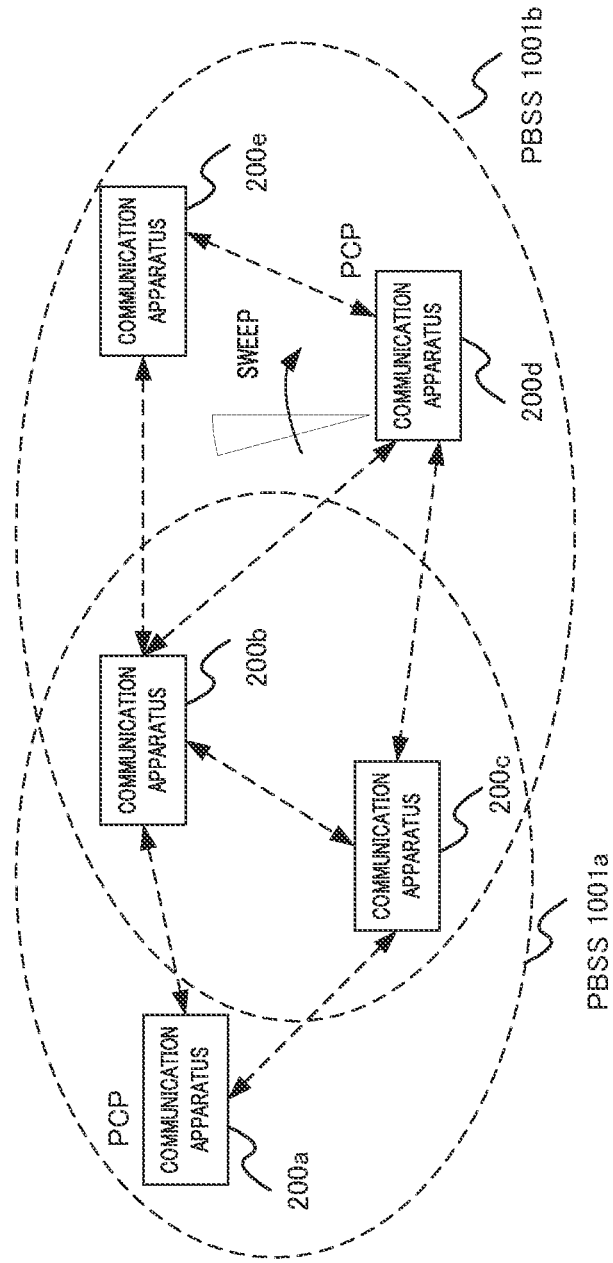
FIG. 5 illustrates another exemplary procedure for establishing communication links by the communication apparatuses according to Embodiment 1.

FIG. 5 illustrates another exemplary procedure for establishing communication links by the communication apparatuses according to Embodiment 1. FIG. 5 illustrates a situation where communication apparatuses 200 (200a, 200b, 200c, 200d, and 200e) configure PBSS 1001a, where communication apparatus 200a is the PCP and communication apparatuses 200b and 200c are participated, and PBSS 1001b, where communication apparatus 200d is the PCP and communication apparatuses 200e is participated, as in FIG. 3C, and communication apparatus 200d approaches communication apparatuses 200b and 200c.

Participation of each of communication apparatuses 200b and 200c in PBSS 1001a is controlled by MAC control circuitry 103a, and communication apparatuses 200b and 200c control the communication in accordance with the scheduling information from communication apparatus 200a, which is the PCP. Note that the communication control by communication apparatuses 200b and 200c in accordance with the scheduling information from communication apparatus 200a, which is the PCP, is referred to as synchronization with communication apparatus 200a by communication apparatuses 200b and 200c.

When approaching communication apparatus 200d, communication apparatuses 200b and 200c may use the other MAC control circuitry 103b to perform an association procedure with communication apparatus 200d and participate in PBSS 1001b. That is, communication apparatus 200 may participate in a plurality of PBSSs in accordance with the number of pieces of MAC control circuitry 103 provided.

The number of pieces of MAC control circuitry 103 provided, however, limits the number of PBSSs in which communication apparatus 200 can participate. For example, when communication apparatus 200f (not illustrated), which is the PCP of PBSS 1001c (not illustrated), approaches communication apparatus 200b in FIG. 5, it is difficult for communication apparatus 200b to further participate in PBSS 1001c to communicate with communication apparatus 200f since communication apparatus 200b has already participated in two PBSSs.

In addition, communication apparatus 200 includes a plurality of pieces of MAC control circuitry 103a and 103b, or uses MAC control circuitry 103 in FIG. 2 with improved processing performance, causing increase in the size of circuitry and increase in power consumption.

Next, descriptions will be given of methods for enabling mutual communication with surrounding communication apparatuses without increasing the size of circuitry in the V2X communication system.

Figure 6A:
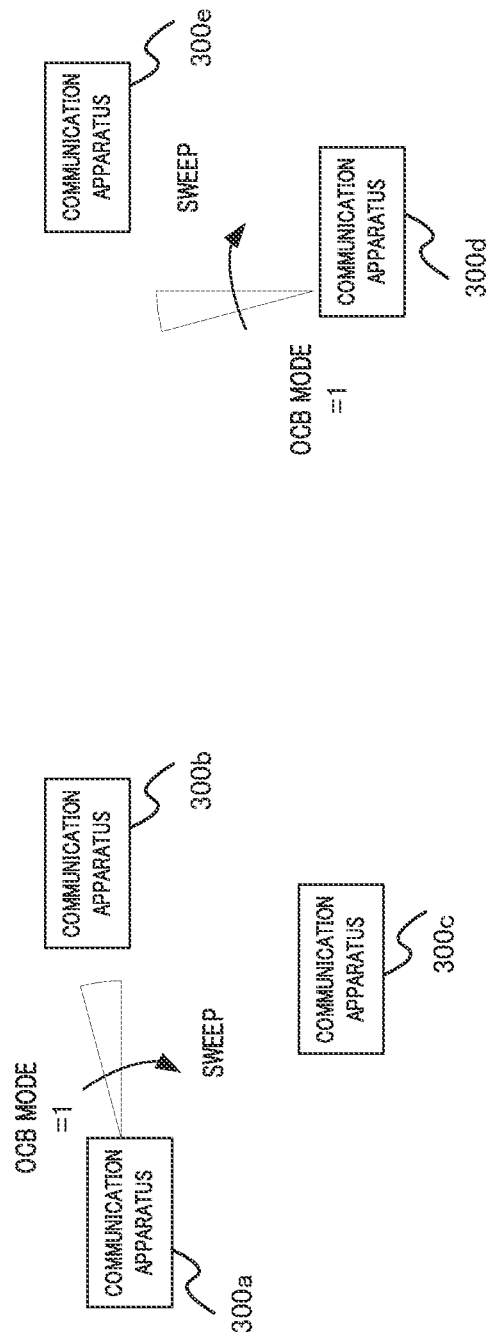
FIG. 6A illustrates an exemplary procedure for establishing communication links by the communication apparatuses according to Embodiment 1.
Figure 6B:
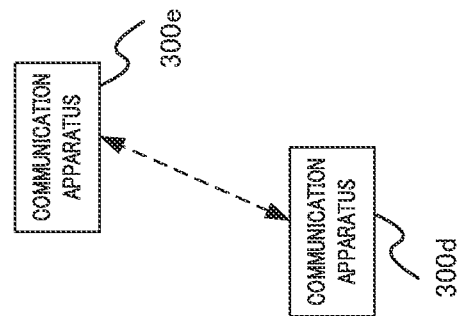
FIG. 6B illustrates another exemplary procedure for establishing communication links by the communication apparatuses according to Embodiment 1.
Figure 6B:
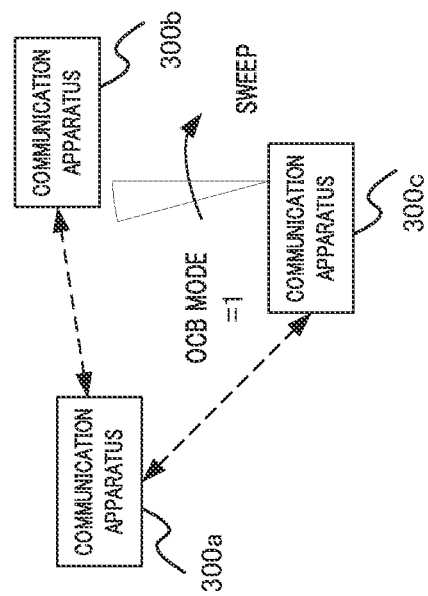
Figure 6C:
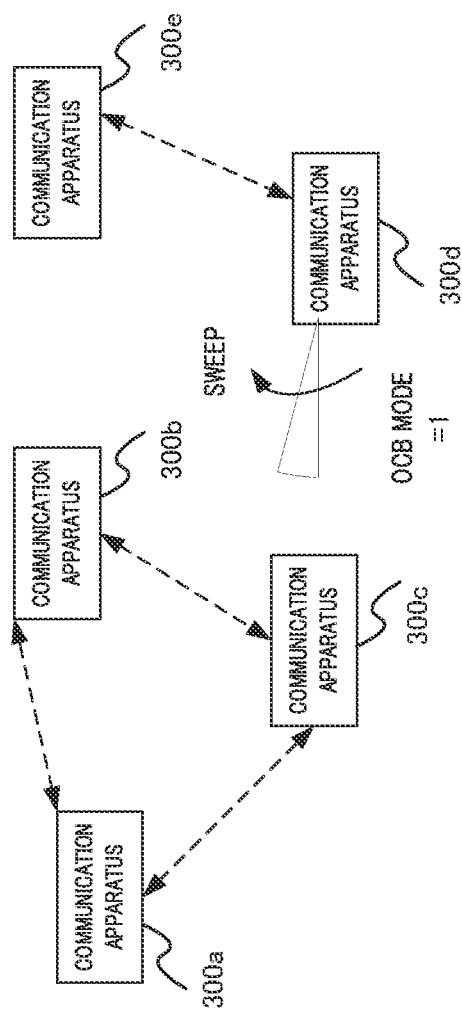
FIG. 6C illustrates still another exemplary procedure for establishing communication links by the communication apparatuses according to Embodiment 1.
Figure 6D:
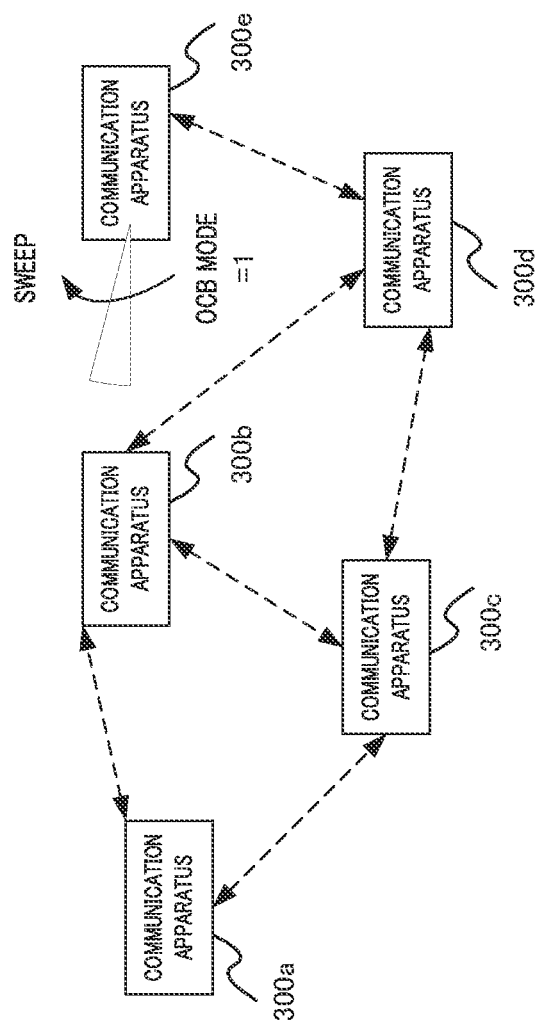
FIG. 6D illustrates still another exemplary procedure for establishing communication links by the communication apparatuses according to Embodiment 1.

FIG. 6A illustrates an exemplary procedure for establishing communication links by the communication apparatuses according to Embodiment 1. FIG. 6B illustrates another exemplary procedure for establishing communication links by the communication apparatuses according to Embodiment 1. FIG. 6C illustrates still another exemplary procedure for establishing communication links by the communication apparatuses according to Embodiment 1. FIG. 6D illustrates still another exemplary procedure for establishing communication links by the communication apparatuses according to Embodiment 1. FIG. 6A to FIG. 6E illustrate methods for mutual communication between communication apparatuses 300 (300a, 300b, 300c, 300d, and 300e). The configuration of communication apparatus 300 is the same as that of communication apparatus 100 in FIG. 2, but MAC control circuitry 103 and host CPU 104 perform different operations by control methods different from those in FIG. 3A to FIG. 3C.

In FIG. 6A, communication apparatuses 300a and 300d transmit a plurality of DMG beacon frames with the values of outside the context of a BSS (OCB: not participating in BSS) mode subfields set to 1 (flagged) while changing the antenna directivity of antenna 101. The OCB mode subfield includes a value indicating whether communication apparatus 300 performs mutual communication without participating in a BSS. A value of 1 in the OCB mode subfield indicates that communication apparatus 300 transmits a data frame without performing association. Note that communication apparatuses 300d and 300e may transmit the DMG beacon frames by setting the values of discovery mode subfields to 1 in addition to the OCB mode subfields.

Figure 7A:
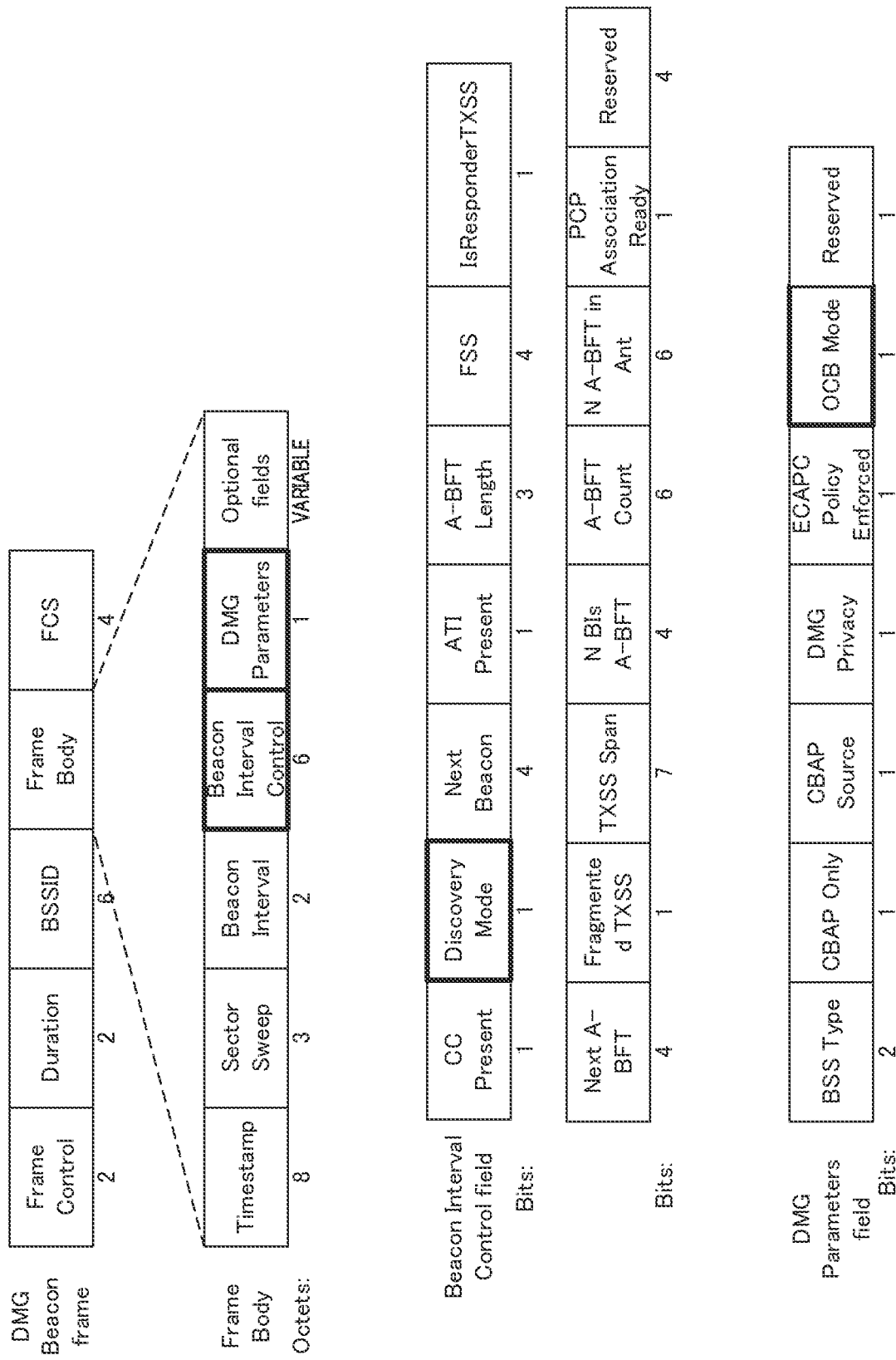
FIG. 7A illustrates an exemplary format of a DMG beacon frame according to Embodiment 1.

FIG. 7A illustrates an exemplary format of the DMG beacon frame according to Embodiment 1. FIG. 7A illustrates a format of the DMG beacon frame. The DMG beacon frame includes a frame control field, duration field, BSSID field, frame body field, and FCS field.

The frame control field includes information indicating the type of frame and indicates that it is the DMG beacon frame. The duration field indicates the time until the end of transmission of a plurality of DMG beacons in a case where communication apparatus 300 transmits a plurality of DMG beacon frames.

The basic service set identifier (BSSID) indicates the identification number of the BSS. When communicating in the OCB mode, communication apparatus 300 sets the value of the BSSID field to a value indicating a wild card (all bits are 1).

The frame body includes a plurality of fields, which will be described later. The field check sequence (FCS) includes an error detection code (e.g., cyclic redundancy check (CRC)).

The frame body includes a timestamp field, sector sweep field, beacon interval field, beacon interval control field, and DMG parameters field. One or more unnecessary fields, which are referred to as optional fields, may also be added.

The timestamp field includes information for time synchronization between communication apparatuses.

The sector sweep field includes information related to the directivity such as a sector number and an antenna array number in a case where communication apparatus 300 transmits a plurality of DMG beacon frames while changing the antenna directivity of antenna 101. Another communication apparatus that has received the DMG beacon frames includes, in an SSW frame to be described later, the sector number and antenna array number included in the DMG beacon frame with the best reception quality, and indicates to communication apparatus 300. This allows communication apparatus 300 to select the best sector number and antenna array number (i.e., best directivity) to transmit a data frame.

A beacon interval field includes a CC present subfield, discovery mode subfield, next beacon subfield, ATI present subfield, A-BFT length subfield, FSS subfield, IsResponderTXSS subfield, next A-BFT subfield, fragmented TXSS subfield, TXSS span subfield, N BIs A-BFT subfield, A-BFT count subfield, N A-BFT in Ant subfield, PCP association ready subfield, and reserved bits.

Communication apparatus 300 sets the discovery mode subfield to 1. With this setting, communication apparatus 300 indicates that the DMG beacon to be transmitted does not indicate BSS synchronization information.

Descriptions will be omitted about the next beacon subfield, ATI present subfield, A-BFT length subfield, FSS subfield, IsResponderTXSS subfield, next A-BFT subfield, fragmented TXSS subfield, TXSS span subfield, N BIs A-BFT subfield, A-BFT count subfield, N A-BFT in Ant subfield, PCP association ready subfield, and reserved bits (see NPL 1).

A DMG parameters field includes a BSS type subfield, CBAP only subfield, CBAP source subfield, DMG privacy subfield, ECAPC policy enforced subfield, OCB mode subfield, and reserved bit.

FIG. 7B illustrates exemplary BSS type subfield values and the description according to Embodiment 1. FIG. 7B illustrates BSS type subfield values and the description according to Embodiment 1. In a case where an AP responds to a DMG beacon frame transmitted by communication apparatus 300, the value of the BSS type subfield is set to 3. In a case where a PCP responds to a DMG beacon frame transmitted by communication apparatus 300, the value of the BSS type subfield is set to 2. By way of example, in FIG. 3C, communication apparatus 100b may discover communication apparatus 100d by transmitting a DMG beacon frame (not illustrated), but when communication apparatus 100b sets the value of the BSS type subfield of the DMG beacon frame to 2 at this time, communication apparatus 100d, which is the PCP, responds to the DMG beacon frame.

Communication apparatus 300 sets the value of the BSS type field to 1 or 0 so that another communication apparatus responds to the DMG beacon frame by transmitting an SSW frame with the value of an OCB response subfield, which will be described later, set to 1. Communication apparatus 300 communicates with another communication apparatus supporting the OCB mode, and/or sets the value of the BSS type subfield to 0 when connecting to an existing AP or PCP.

Communication apparatus 300 does not use an AP or PCP and does not schedule the communication timing in the OCB mode, and thus communication apparatus 300 sets the value of the CBAP only field in FIG. 7A to 1.

Communication apparatus 300 sets the value of the OCB mode subfield to 1 to use the OCB mode. The OCB mode subfield is an added field using a reserved bit in the IEEE 802 11ad standard. That is, a communication apparatus (communication apparatus 100 or 200) that complies with the IEEE 802.11ad standard and does not support the OCB mode ignores the OCB mode subfield, and responds to a DMG beacon frame when the value indicated by the BSS type matches the role of communication apparatus 100 or 200.

Note that the OCB mode subfield may be included in the beacon interval control field or another field instead of the DMG parameters field. Further, an OCB parameters field (not illustrated), for example, may be added as an optional field of a DMG beacon frame to indicate that the OCB mode is supported when the OCB parameters field is present in the DMG beacon frame, and that the OCB mode is not supported when no OCB parameters field is present.

When transmitting the DMG beacon frame in FIG. 7A, communication apparatus 300 may receive a response from a communication apparatus supporting the OCB mode and communication apparatus 100 or 200 not supporting the OCB mode. When receiving a response from a communication apparatus not supporting the OCB mode, communication apparatus 300 may transmit a probe request frame and perform the active scan procedure described in the IEEE 802.11ad standard. That is, communication apparatus 300 can communicate with a communication apparatus supporting the OCB mode and a communication apparatus not supporting the OCB mode.

Descriptions will be omitted about the other fields in the DMG parameters field (CBAP only subfield, CBAP source subfield, DMG privacy subfield, ECAPC policy enforced subfield, and reserved bit) (see NPL 1).

In FIG. 6B, when communication apparatuses 300b and 300c receive DMG beacon frames in FIG. 7A from communication apparatus 300a, they transmit sector sweep (SSW) frames to respond, which will be described later (see FIG. 8). In FIG. 6B, communication apparatus 300a does not initiate a PBSS and communication apparatuses 300b and 300c perform no association procedures with communication apparatus 300a, but communication apparatus 300a and communication apparatus 300b may communicate with each other and communication apparatus 300a and communication apparatus 300c may communicate with each other. Note that FIG. 10 will be used later to describe a detailed procedure in which the combination of communication apparatus 300a and communication apparatus 300b and the combination of communication apparatus 300a and communication apparatus 300c start communication with each other in FIG. 6B.

Note that, in FIG. 6B, communication apparatuses 300d and 300e communicate with each other in the same manner without initiating a PBSS nor performing the association procedure.

FIG. 6C is used for describing how communication apparatuses 300d and 300b communicate with each other and communication apparatuses 300d and 300c communicate with each other when communication apparatus 300d approaches communication apparatuses 300b and 300c.

Communication apparatus 300d transmits DMG beacon frames in FIG. 7A a plurality of times while setting the values of the OCB mode subfields in the DMG beacon frames to 1 and changing the antenna directivity of antenna 101. Communication apparatuses 300b and 300c transmit SSW frames to respond when receiving the DMG beacon frames in FIG. 7A from communication apparatus 300d. Communication apparatus 300d does not initiate a PBSS, and communication apparatuses 300b and 300c perform no association procedure with communication apparatus 300d, but communication apparatus 300d and communication apparatus 300b may communicate with each other, and communication apparatus 300d and communication apparatus 300c may communicate with each other.

That is, the procedure in which communication apparatus 300d communicates with communication apparatuses 300b and 300c in FIG. 6C is the same as the procedure in which communication apparatus 300a communicates with communication apparatuses 300b and 300c in FIG. 6A. The procedure in which communication apparatus 300d communicates with communication apparatuses 300b and 300c does not depend on whether communication apparatus 300d has already communicated with communication apparatus 300e.

Note that, in FIG. 6D, communication apparatus 300e may communicate with communication apparatuses 300b and 300c using the DMG beacon frame in FIG. 7A as is the case with communication apparatus 300d in FIG. 6C.

Figure 6E:
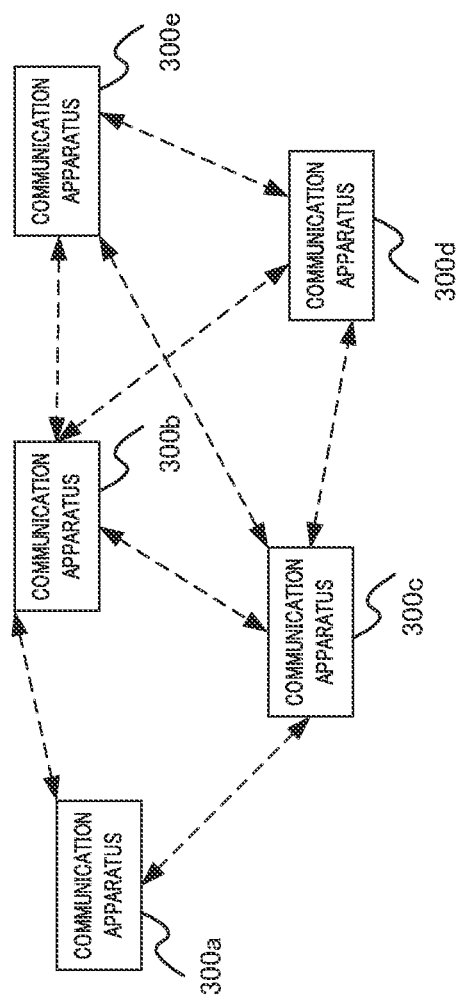
FIG. 6E illustrates radio links established by applying the procedures in FIG. 6A to FIG. 6D.

FIG. 6E illustrates radio links established by applying the procedures in FIG. 6A to FIG. 6D. Unlike FIG. 3C, radio links can be established between the pair of communication apparatus 300b and communication apparatus 300d, the pair of communication apparatus 300c and communication apparatus 300d, the pair of communication apparatus 300b and communication apparatus 300e, and the pair of communication apparatus 300c and communication apparatus 300e. Thus, communication apparatus 300 using the DMG beacon frame in FIG. 7A can communicate with a larger number of communication apparatuses. In addition, unlike communication apparatus 200 in FIG. 4, communication apparatus 300 does not need a plurality of pieces of MAC control circuitry 103, so that the size of the circuitry is small and the power consumption is small.

Figure 8A:
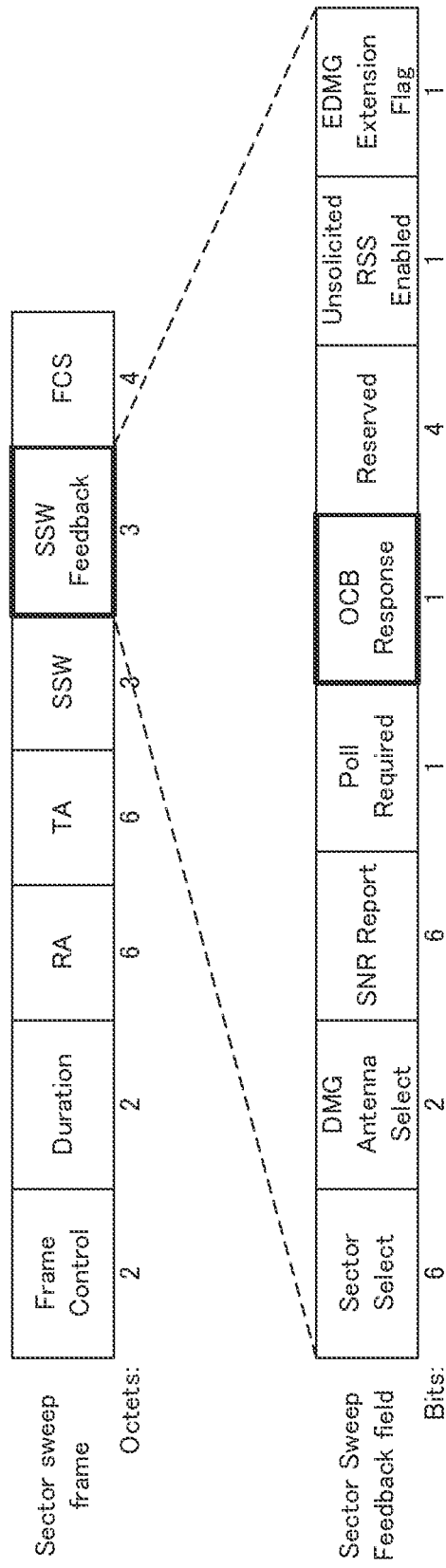
FIG. 8A illustrates an exemplary format of an SSW frame according to Embodiment 1.

FIG. 8A illustrates an exemplary format of the SSW frame according to Embodiment 1. The SSW frame includes a frame control field, duration field, receiver address (RA) field, transmitter address (TA) field, SSW field, SSW feedback field, and FCS field.

The frame control field includes information indicating the type of frame and information indicating that it is an SSW frame. The duration field indicates the time until the completion of sector level sweep (SLS: a form of beamforming training). The RA and TA fields respectively include a MAC address of a communication apparatus that receives the SSW frame and a MAC address of a communication apparatus that transmits the SSW frame. The SSW field includes information necessary for the SLS such as a sector number and an antenna array number.

The SSW feedback field includes a sector select subfield, DMG antenna select subfield, SNR report subfield, poll required subfield, OCB response subfield, reserved bits, unsolicited RSS enabled subfield, and EDMG extension flag subfield.

The OCB response subfield indicates that communication apparatus 300 transmits a data frame without performing association, which is referred to as the OCB mode. When communication apparatus 300 receives a DMG beacon frame with the OCB mode subfield set to 1 from another communication apparatus, it transmits an SSW frame with the OCB mode subfield set to 1.

The OCB response subfield may be referred to as another name such as an OCB mode subfield and OCB supported.

Descriptions will be omitted about the other subfields in the SSW feedback field (sector select subfield, DMG antenna select subfield, SNR report subfield, poll required subfield, reserved bit, unsolicited RSS enabled subfield, and EDMG extension flag subfield) (see NPL 1).

Communication apparatus 300 may transmit a short SSW packet instead of the SSW frame in FIG. 8A. FIG. 8B illustrates an exemplary format of a short SSW packet payload according to Embodiment 1.

A short SSW packet includes a packet type field, direction field, OCB response field, source AID field, destination AID field, CDOWN field, RF chain ID field, short SSW feedback field, and FCS field.

The OCB response subfield indicates that communication apparatus 300 supports the OCB mode. When communication apparatus 300 receives a DMG beacon frame with the OCB mode subfield set to 1 from another communication apparatus, it transmits a short SSW packet with the OCB response field set to 1.

Descriptions will be omitted about the other fields in the SSW packet (packet type field, direction field, source AID field, destination AID field, CDOWN field, RF chain ID field, short SSW feedback field, and FCS field) (see NPL 1).

Figure 9:
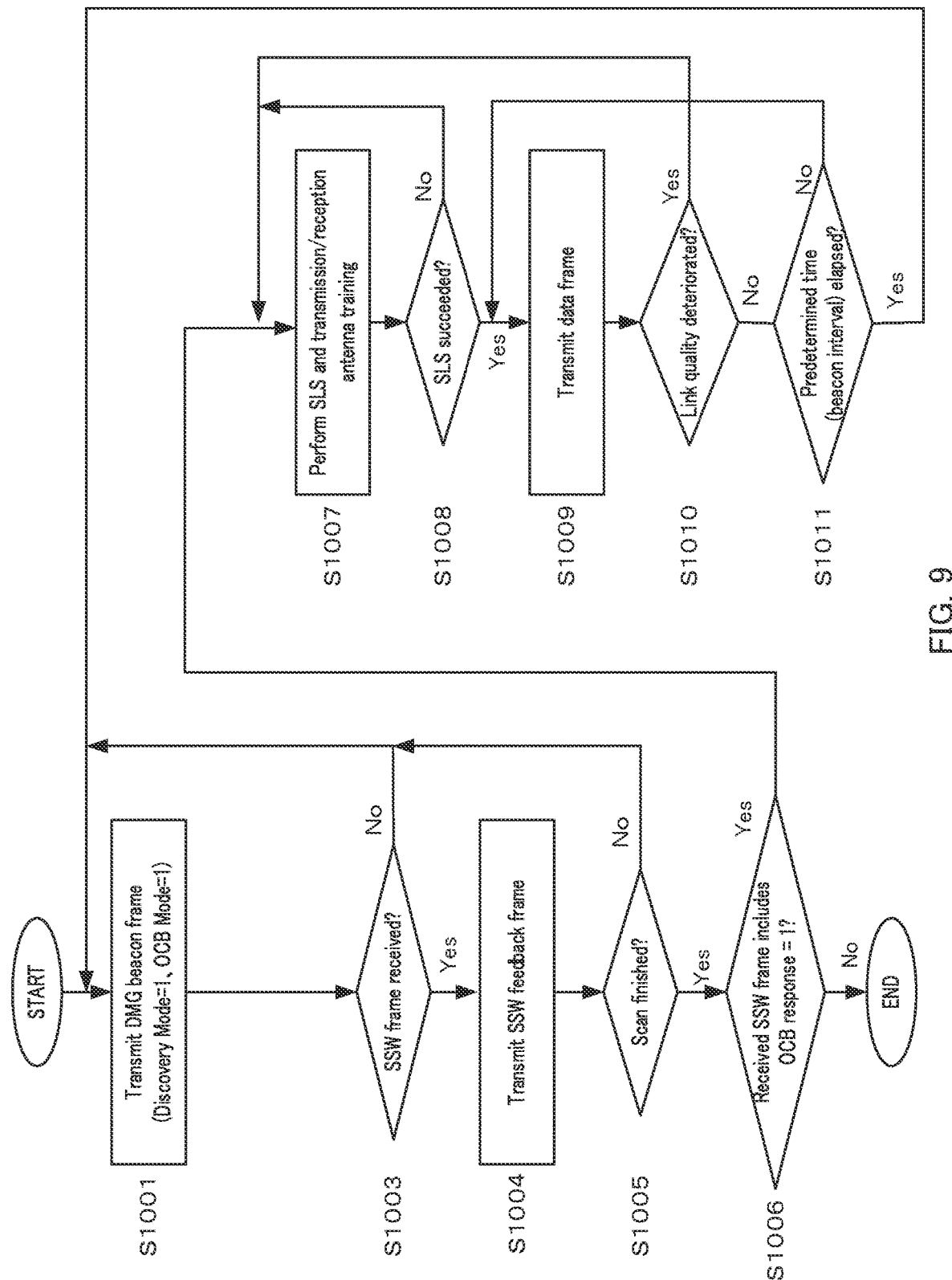
FIG. 9 is a flowchart describing an exemplary procedure for performing millimeter-wave communication by the communication apparatus according to Embodiment 1.

FIG. 9 is a flowchart describing an exemplary procedure for performing millimeter-wave communication by the communication apparatus according to Embodiment 1. FIG. 9 illustrates a procedure for communication apparatus 300a to communicate with communication apparatus 300b.

(Step S1001) Communication apparatus 300a receives a scan start indication (not illustrated) and starts the operation of step S1001. Communication apparatus 300a sets 1 for the values of the discovery mode subfield and the OCB mode subfield in the DMG beacon frame in FIG. 7A and transmits the DMG beacon frame. Communication apparatus 300a may transmit a plurality of DMG beacon frames while changing the antenna directivity of antenna 101.

(Step S1003) When receiving an SSW frame in A-BFT (Yes in step S1003), communication apparatus 300a proceeds to step S1004. When receiving no SSW frame (No in step S1003), communication apparatus 300a returns to step S1001.

(Step S1004) In a case of "Yes" in step S1003, communication apparatus 300a transmits an SSW feedback frame to the source of the SSW frame, which is communication apparatus 300b by way of example.

(Step S1005) Communication apparatus 300a determines whether the scan is finished, and proceeds to step S1006 when the scan is finished (Yes in step S1005). Communication apparatus 300a may determine that the scan is finished when a predetermined scan time has elapsed since the start of the scan in step S1001. The scan time may be indicated to MAC control circuitry 103 from host CPU 104, for example, by including in the scan start indication in step S1001. Communication apparatus 300a returns to step S1001 when the scan is not finished (No in step S1005).

Specifying the scan time based on an allowable delay time enables communication apparatus 300a to communicate with many communication apparatuses within the allowable delay time. The scan time is, for example, 200 milliseconds or more and less than 300 milliseconds.

Communication apparatus 300a may determine as "Yes" in step S1005 regardless of whether the scan time has elapsed when receiving at least one SSW frame with the OCB mode subfield set to 1. That is, the order of step S1005 and step 1006, which will be described later, may be switched. This allows communication apparatus 300a to discover with little delay and start communication with another communication apparatus 300b that supports the OCB mode and can communicate with communication apparatus 300a.

(Step S1006) Communication apparatus 300a proceeds to step S1007 when receiving at least one SSW frame with the OCB mode subfield set to 1 (Yes in step S1006). In a case of "No" in step S1006, communication apparatus 300a terminates the processing.

(Step S1007) Communication apparatus 300a performs training of the transmission and reception antennas by performing the sector level sweep (SLS: one form of beamforming training) with communication apparatus 300b, which has transmitted the SSW frame with the OCB mode subfield set to 1. This allows communication apparatuses 300a and 300b to select the directivity of the transmission antenna and reception antenna so as to improve the communication quality, thereby increasing the data rate.

Communication apparatus 300a may perform a beam refinement protocol (BRP) in step S1007. The BRP is a scheme for improving communication quality by controlling the directivity of antenna 101 more precisely than the SLS.

(Step S1008) When the SLS is not successfully completed in step S1008 (No in step S1008), communication apparatus 300a returns to step S1007. When the SLS is not successfully completed in step S1008, communication apparatus 300a may repeat step S1007 several times, and if the SLS is still not successfully completed, communication apparatus 300a may return to step S1001.

The reasons why the SLS is not successfully completed are, for example, a case where vehicles or pedestrians with communication apparatuses 300a and 300b move and communication apparatuses 300a and 300b are far from each other, and a case where an obstruction (e.g., another vehicle) between communication apparatuses 300a and 300b makes it difficult to establish a radio link. In this case, communication apparatus 300a may return to step S1001 and perform the procedure again. This allows communication apparatus 300a to discover another communication apparatus that can be communicated with, or to connect to communication apparatus 300b again after the obstruction moves.

When the SLS is successfully completed in step S1008 (Yes in step S1008), communication apparatus 300a proceeds to step S1009.

(Step S1009) Communication apparatus 300a configures antenna 101 to the directivity selected in step S1007, and transmits a data frame.

(Step S1010) Communication apparatus 300a may return to step S1007 to perform the SLS with communication apparatus 300b when the link quality is deteriorated (Yes in step S1010); for example, when the reception power or signal to noise (S/N) ratio is deteriorated, or when the packet error rate is increased. Meanwhile, when the link quality is not deteriorated (No in step S1010), communication apparatus 300a proceeds to step S1011. Note that communication apparatus 300a may return to step S1007 and perform the SLS regardless of the link quality when a predetermined time has elapsed.

(Step S1011) When a predetermined time (beacon interval) has elapsed since the start of the DMG beacon frame transmission in step S1001 (Yes in step S1011), communication apparatus 300a returns to step S1001 and transmits another DMG beacon frame. This process is for discovering and starting communication with a communication apparatus that has approached communication apparatus 300a during the predetermined time. Meanwhile, communication apparatus 300a returns to step S1009 and transmits a data frame until the predetermined time has elapsed (No in step S1011).

The time (beacon interval) during which communication apparatus 300a repeats step S1001 may be randomly determined each time step S1001 is performed between 10 time units (TUs: 1 TU is 1.024 milliseconds) and less than 200 TUs.

Communication apparatus 300a may change the time interval for performing the SLS according to the moving speed of vehicle 10a or pedestrian 20a with communication apparatus 300a. When vehicle 10a or pedestrian 20a moves faster, shortening the time interval for performing the SLS makes it possible to maintain high radio link quality, and when vehicle 10a or pedestrian 20a moves slowly or is stopped, extending the time interval for performing the SLS makes it possible to reduce deterioration of the data rate due to the overhead of the SLS and reduce interference with another communication apparatus.

When communication apparatus 300a operates in the OCB mode, that is, when communication apparatus 300a transmits a DMG beacon frame in FIG. 7A by setting the value of the OCB mode subfield to 1 and receives an SSW frame in FIG. 8 from communication apparatus 300b with the value of the OCB response subfield set to 1, communication apparatus 300a may shorten the time interval for performing the SLS with communication apparatus 300b.

Meanwhile, when communication apparatus 100a does not operate in the OCB mode, that is, when communication apparatus 100a receives an SSW frame with the OCB response subfield set to 0 from communication apparatus 100b, communication apparatus 100a may extend the time interval for performing the SLS with communication apparatus 300b.

With this configuration, in a case where communication apparatus 300b supporting the OCB mode is mounted on a vehicle, the radio link quality can be maintained to be high by shortening the time interval for performing the SLS. In a case where communication apparatus 100b not supporting the OCB mode is mounted on an immovable apparatus, such as a base station or access point, extending the time interval for performing the SLS makes it possible to reduce deterioration of the data rate due to the overhead of the SLS and reduce interference with another communication apparatus.

Communication apparatus 300 mounted on vehicle 10, pedestrian 20, or a moving body can flexibly change a radio link according to the movement of the communication apparatuses as illustrated in FIG. 6A to FIG. 6E by using the OCB mode, in a situation where many radio links are established between a large number of communication apparatuses illustrated in FIG. 1B. In addition, although communication apparatus 300 mounted on roadside unit 30 does not move, using the OCB mode enables communication with communication apparatus 300 mounted on vehicle 10 or pedestrian 20 by a single mode (OCB mode), thereby simplifying the MAC control.

Meanwhile, in a case where moving communication apparatus 300 performs communication using an immovable base station or access point and directly communicates with another moving communication apparatus 300, performing association instead of using the OCB mode makes it possible to utilize a function such as scheduling, thus resulting in efficient communication.

Note that, in a case where communication apparatus 300a receives at least one SSW frame with the OCB response subfield set to 0 (by way of example, the source is communication apparatus 100b), communication apparatus 300a may start the association procedure with communication apparatus 100b after transmitting an SSW feedback frame in step S1004, receiving or transmitting a probe request frame, and finishing the scan.

For example, when an SSW frame with the OCB response subfield set to 0 is received in step S1006 (No in step S1006), communication apparatus 300a terminates the procedure in FIG. 9 and performs a procedure for starting or participating in a PBSS defined in the IEEE 802.11ad standard as illustrated in FIG. 3A to FIG. 3C. When an SSW frame with the OCB response subfield set to 1 is received in step S1006 (Yes in step S1006), communication apparatus 300a performs the procedure in step S1007 and subsequent steps in FIG. 9. This makes it possible to establish a large number of radio links as illustrated in FIG. 6A to FIG. 6E.

Thus, in a situation where communication apparatuses 300 supporting the OCB mode and communication apparatuses compliant with the IEEE 802.11ad not supporting the OCB mode are both present, communication apparatus 300 can communicate with each of the communication apparatuses.

Note that, although communication apparatus 300 is configured to perform the SLS in step S1007, it may perform a beam refinement protocol (BRP) procedure. In a case where communication apparatuses 300a and 300b have established a radio link according to the procedure from step S1001 to step S1006, performing the BRP instead of the SLS allows communication apparatus 300 to perform high-precision beamforming with low latency. Meanwhile, in a case where it is determined in step S1010 that a radio link is disconnected or a case where the SN ratio is low and the BRP is less likely to succeed, performing the SLS as described above makes communication apparatus 300 more likely to succeed in beamforming.

Figure 10:
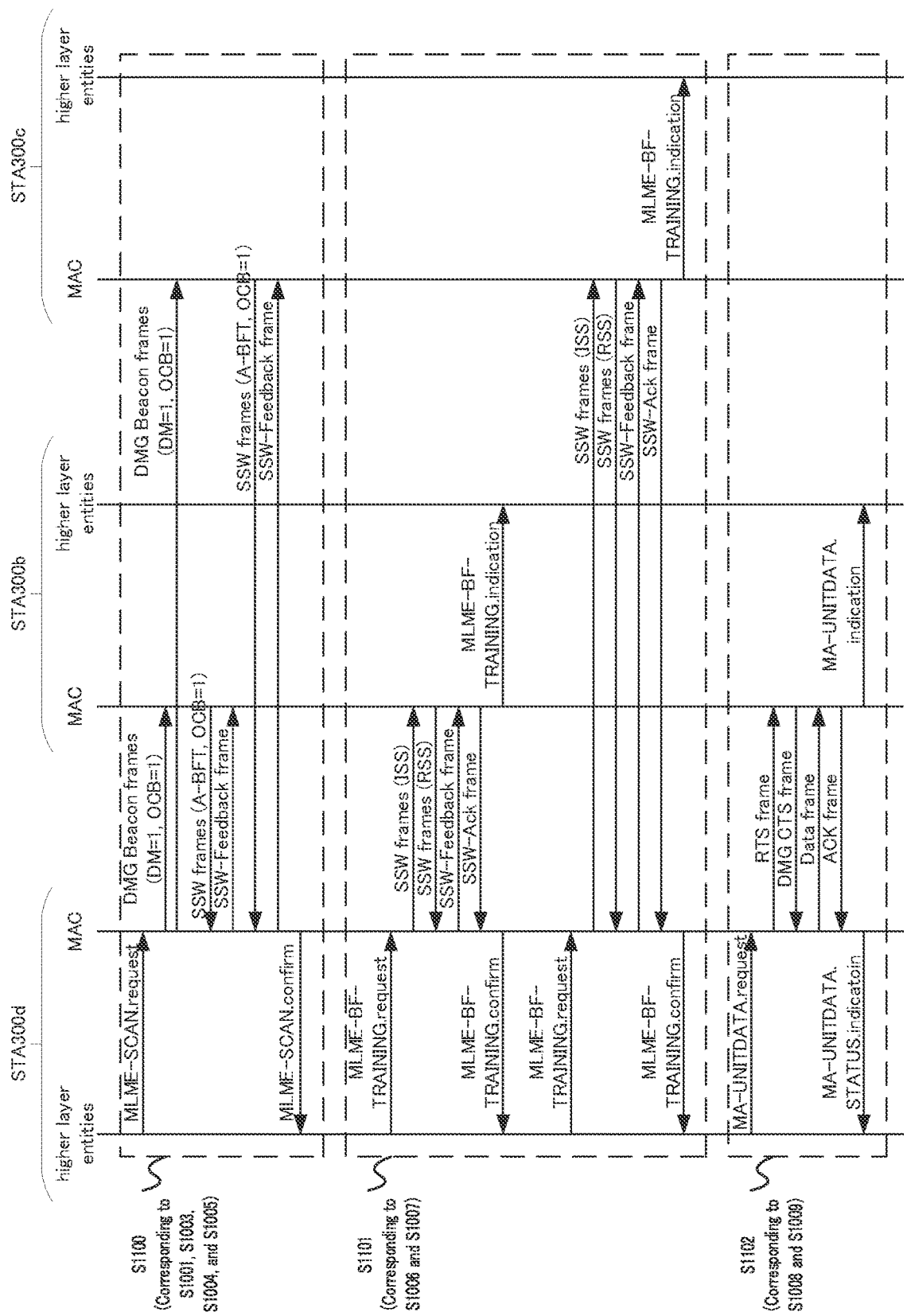
FIG. 10 is a sequence diagram describing an exemplary procedure for performing millimeter-wave communication by the communication apparatus according to Embodiment 1.

FIG. 10 is a sequence diagram describing an exemplary procedure for performing millimeter-wave communication by the communication apparatus according to Embodiment 1. With reference to FIG. 10, a detailed description will be given of a procedure for communication apparatus (station (STA)) 300d to communicate with communication apparatuses 300b and 300c (see FIG. 6C). In FIG. 10, the "MAC" represents the operation of MAC control circuitry 103, by way of example. The "higher layer entities" represent the operation of host CPU 104, by way of example. The "higher layer entities" may be, for example, software such as a station management entity (SME), supplicant, driver, and OS.

In the MAC, an interface specification called a MAC layer management entity (MLME) service access point (SAP) is specified. The MLME SAP includes definitions of primitives prefixed with MLME—, and may be used to control the MAC (MAC control circuitry 103). In addition, an interface specification called a MAC SAP is specified in the MAC. The MAC SAP includes definitions of primitives prefixed with MA—, and may be used to control data transmission and reception in the MAC (MAC control circuitry 103).

Note that the interface specifications and primitives of the MLME SAP and MAC SAP are specified for convenience, and a signal exchanged between MAC control circuitry 103 and host CPU 104 depends on the implementation. Examples of the signal exchanged between MAC control circuitry 103 and host CPU 104 include a PCI express signal, universal serial bus (USB) signal, serial communication signal, and function call. Further, part of the higher layer entities may be implemented as part of MAC control circuitry 103. In this case, the interface specifications and primitives of the MLME SAP and MAC SAP are internal signals of MAC control circuitry 103.

Thus, the interface specifications and primitives of the MLME SAP and MAC SAP are not intended to limit the operation of communication apparatus 300, but used to describe the contents and transmission/reception order of a series of frames exchanged between communication apparatus 300d and communication apparatus 300b.

(Step S1100) In FIG. 10, the MLME-SCAN.request issued by the higher layer entities to the MAC represents a scan start indication. MAC control circuitry 103 of communication apparatus 300d takes the MLME-SCAN.request as a trigger, and starts the procedure in FIG. 9 from step S1001.

The MAC of communication apparatus 300d transmits a DMG beacon frame with the discovery mode subfield set to 1 and the OCB mode subfield set to 1 (corresponding to step S1001 in FIG. 9). Communication apparatuses 300b and 300c each receive the DMG beacon frame.

The MAC of communication apparatuses 300b and 300c each transmit an SSW frame with the OCB response field set to 1 as a response to the DMG beacon frame (corresponding to step S1003 in FIG. 9). Note that communication apparatuses 300b and 300c may each avoid a conflict between the transmission of communication apparatus 300b and the transmission of communication apparatus 300c by transmitting the SSW frame in a time slot for which the transmission timing of the SSW frame is randomly selected, based on a method of the association beamforming training (A-BFT) described in the IEEE 802.11ad standard.

When receiving the SSW frames from communication apparatuses 300b and 300c, communication apparatus 300d transmits SSW feedback frames (corresponding to step 1004 in FIG. 9).

When the scan time has elapsed, the MAC of communication apparatus 300d completes the scan and issues an MLME-SCAN.confirm primitive to the higher layer entities. The MLME-SCAN.confirm primitive includes the MAC addresses of source communication apparatuses 300b and 300c from which the SSW frames are received in step S1003, link quality information, and information indicating whether each of communication apparatuses 300b and 300c supports the OCB mode. As an example of implementation of the MLME-SCAN.confirm primitive, MAC control circuitry 103 indicates, to host CPU 104, information included in the MLME-SCAN.confirm as scan report information.

At this time, by way of example, supplicant software running on host CPU 104 may display the scan report information on a display included in peripheral 105. In addition, the supplicant software may perform determination of step S1006 in FIG. 9 based on the scan report information, and determine whether to perform association for a PBSS or communicate in the OCB mode (steps S1007 to S1010).

(Step S1101) The higher layer entities of communication apparatus 300d perform determination of step S1006, and in a case of Yes, issues an MLME-BF-TRAINING.request primitive to the MAC and starts the SLS with communication apparatus 300b (corresponding to step S1007 in FIG. 9). The SLS includes transmission of an SSW frame (called initiator sector sweep (ISS)) by communication apparatus 300d, transmission of an SSW frame (called responder sector sweep (RSS)) by communication apparatus 300b, transmission of an SSW feedback frame by communication apparatus 300d, and transmission of an SSW Ack frame (corresponding to Acknowledgement) by communication apparatus 300b.

When completing the SLS, the MAC of communication apparatus 300d issues an MLME-BF-TRAINING.confirm primitive to the higher layer entities. Note that communication apparatus 300d may issue the MLME-BF-TRAINING.confirm primitive regardless of whether the SLS has succeeded or not. Information on whether the SLS has succeeded, reception quality, and information of fields included in the SSW frame may be included in the MLME-BF-TRAINING.confirm primitive to indicate to the higher layer entities.

When completing the SLS, the MAC of communication apparatus 300b issues an MLME-BF-TRAINING.indication primitive to the higher layer entities. Note that communication apparatus 300b may issue the MLME-BF-TRAINING.indication primitive regardless of whether the SLS has succeeded or not. Information on whether the SLS has succeeded, reception quality, and information of fields included in the SSW frame may be included in the MLME-BF-TRAINING.indication primitive to indicate to the higher layer entities.

When completing the SLS with communication apparatus 300b, the higher layer entities of communication apparatus 300d may issue an MLME-BF-TRAINING.request primitive to the MAC and start the SLS with communication apparatus 300c.

(Step S1102) The higher layer entities of communication apparatus 300d perform determination of step S1008 based on the information included in the MLME-BF-TRAINING.confirm primitive. When the SLS is successful as a result of the determination in step S1008, the higher layer entities issue an MA-UNITDATA.request primitive to the MAC of communication apparatus 300d to request data transmission processing. The MA-UNITDATA.request primitive includes a destination address and transmission data.

In the data transmission, the MAC of communication apparatus 300d transmits a request to send (RTS) frame, receives a DMG clear to send (CTS) frame, transmits a data frame, and receives an Ack frame (corresponding to step S1009 in FIG. 9).

Communication apparatus 300d transmits the RTS frame and the data frame by configuring antenna 101 to the antenna directivity selected by the SLS in step S1007. When receiving the RTS frame, communication apparatus 300b is not aware from which communication apparatus the RTS frame is transmitted, and thus communication apparatus 300b performs the reception using a quasi-omni antenna (configuring antenna 101 to be a quasi-omni antenna).

After transmitting the DMG CTS frame, communication apparatus 300b expects that the data frame is transmitted from communication apparatus 300d; accordingly, communication apparatus 300b receives the data frame configuring antenna 101 to the directivity determined by the SLS in step S1007. This improves the radio link quality and increases the data rate.

Note that communication apparatus 300d may transmit a DMG CTS to self frame (DMG CTS frame the destination of which is configured to be the address of communication apparatus 300d) instead of the RTS frame. Communication apparatus 300d may transmit a data frame following the DMG CTS to self frame.

In a case of receiving the DMG CTS to self frame, communication apparatus 300b need not transmit the DMG CTS frame, but since it is assumed that a data frame is transmitted next from communication apparatus 300d, communication apparatus 300b receives the data frame configuring antenna 101 to the antenna directivity determined by the SLS in step S1007.

The MAC of communication apparatus 300b transmits the Ack frame and then issues an MA-UNITDATA.indication primitive to the higher layer entities. The MA-UNIT-DATA.indication primitive includes source and destination addresses, received data (content of the data frame received from communication apparatus 300d), information on whether the reception has succeeded (it is taken as a reception failure when the received data frame includes a bit error, for example).

When the MA-UNITDATA.indication primitive indicates successful reception, the higher layer entities of communication apparatus 300b acquire the received data from the MA-UNITDATA.indication primitive and pass the received data to the OS and/or application software.

The MAC of communication apparatus 300d issues an MA-UNITDATA.STATUS.indication primitive to the higher layer entities when receiving the Ack frame or when it has passed the expected time to receive the Ack frame. The MA-UNITDATA.STATUS.indication primitive includes information on whether the transmission of the data frame has succeeded. The transmission of the data frame is regarded as successful in a case where communication apparatus 300d receives the Ack frame.

When receiving the MA-UNITDATA.STATUS.indication primitive, the higher layer entities of communication apparatus 300d may issue a new MA-UNITDATA.request primitive to the MAC and request data transmission from communication apparatus 300c (not illustrated). Alternatively, the communication with communication apparatus 300b may be repeated.

When the MAC indicates that the SLS is successful by the MLME-BF-TRAINING.indication primitive or when the MA-UNITDATA. STATUS.indication primitive or MA-UNITDATA.indication primitive indicates the completion of data transmission or reception (not illustrated), the higher layer entities of communication apparatuses 300b and 300c may each issue the MA-UNITDATA.request primitive to the MAC and request data transmission from communication apparatus 300d (not illustrated).

In addition, the procedure for the higher layer entities of communication apparatus 300d is not limited to that in FIG. 10. When the SLS with communication apparatus 300b is completed and the MLME-BF-TRAINING.confirm primitive is indicated, the higher layer entities of communication apparatus 300d may issue the MA-UNITDATA.request primitive to the MAC and request data transmission from communication apparatus 300b (not illustrated).

As described above, communication apparatus 300 transmits a data frame without performing association in a case of receiving an SSW frame including a signal supporting the OCB mode after transmitting a DMG beacon frame including a signal supporting the OCB mode. This makes it possible to reduce the circuitry size of MAC control circuitry 103 and power consumption, and also enables communication with a large number of moving communication apparatuses.

Variation of Embodiment 1

In Embodiment 1, communication apparatus 300 starts communication in the OCB mode by transmitting a DMG beacon frame with the OCB mode subfield set to 1, receiving an SSW frame with the OCB response field set to 1, and performing beamforming training. When communication apparatus 500 in the present variation receives a DMG beacon frame, communication apparatus 500 includes feedback information in a DMG beacon frame to transmit instead of transmitting an SSW frame. This allows communication apparatus 500 to eliminate the transmission of an SSW frame and reduce interference with another communication apparatus.

Figure 11:
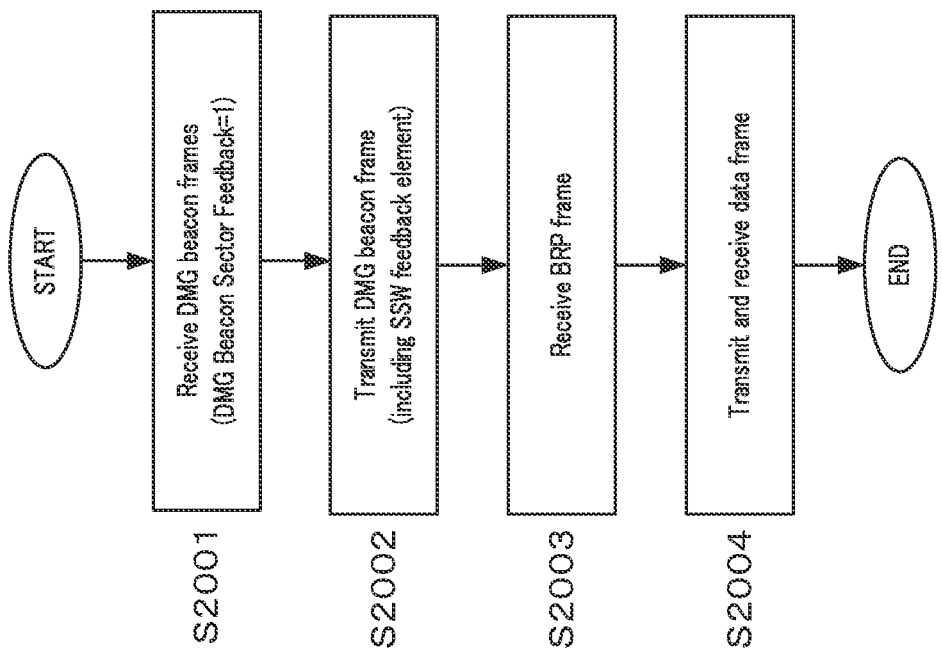
FIG. 11 is a flowchart describing an exemplary operation of the communication apparatus according to a variation of Embodiment 1.

FIG. 11 is a flowchart describing an exemplary operation of the communication apparatus according to the variation of Embodiment 1.

(Step S2001) Communication apparatus 500 receives a plurality of DMG beacon frames transmitted by a different communication apparatus changing the directivity (sector) of an antenna. Communication apparatus 500 records a sector number included in a DMG beacon frame with good reception quality (referred to as best sector information). When receiving a plurality of DMG beacon frames from a plurality of sources, communication apparatus 500 records the best sector information for each source.

(Step S2002) Communication apparatus 500 transmits a DMG beacon frame including the best sector information.

Figure 12A:
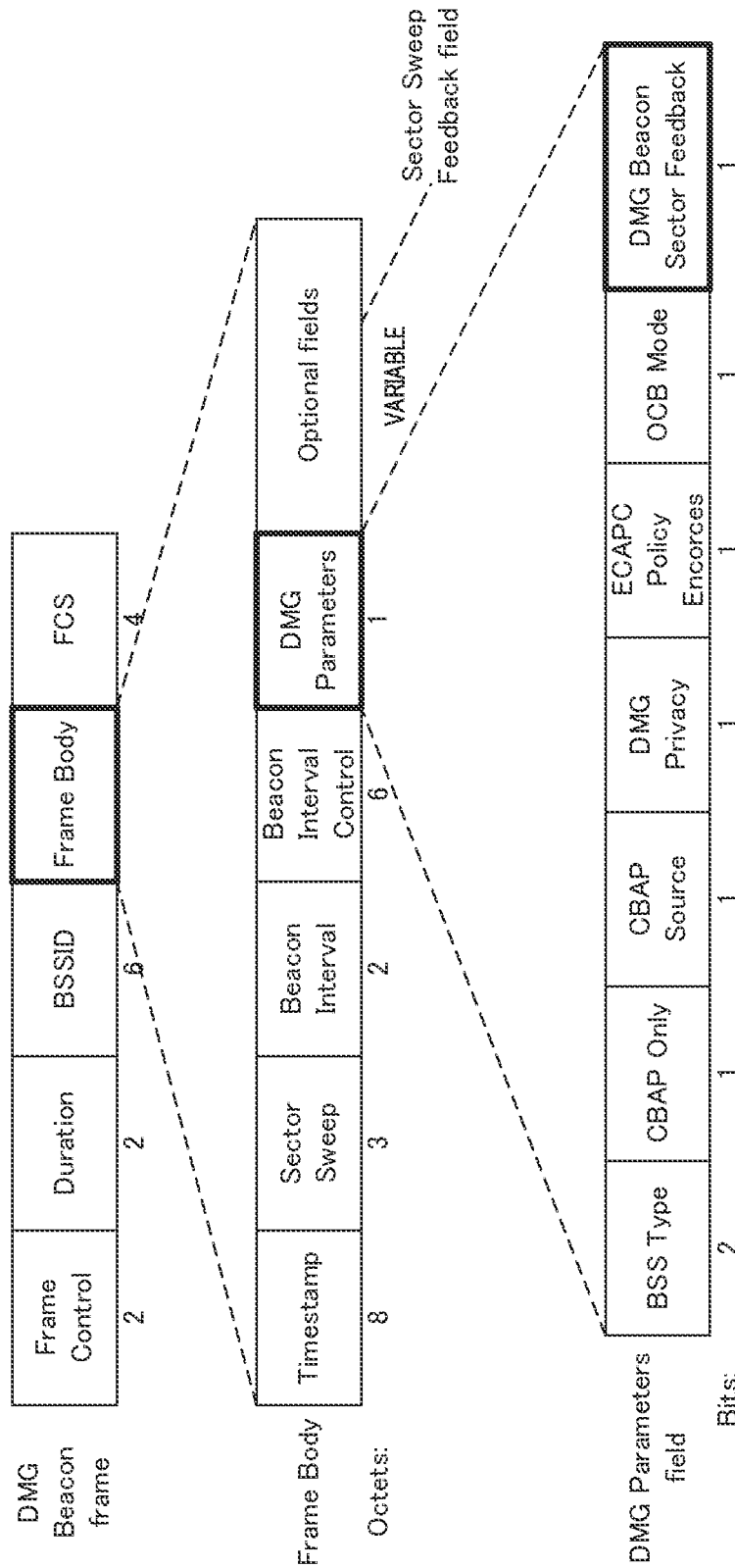
FIG. 12A illustrates an exemplary format of the DMG beacon frame according to the variation of Embodiment 1.
Figure 12B:
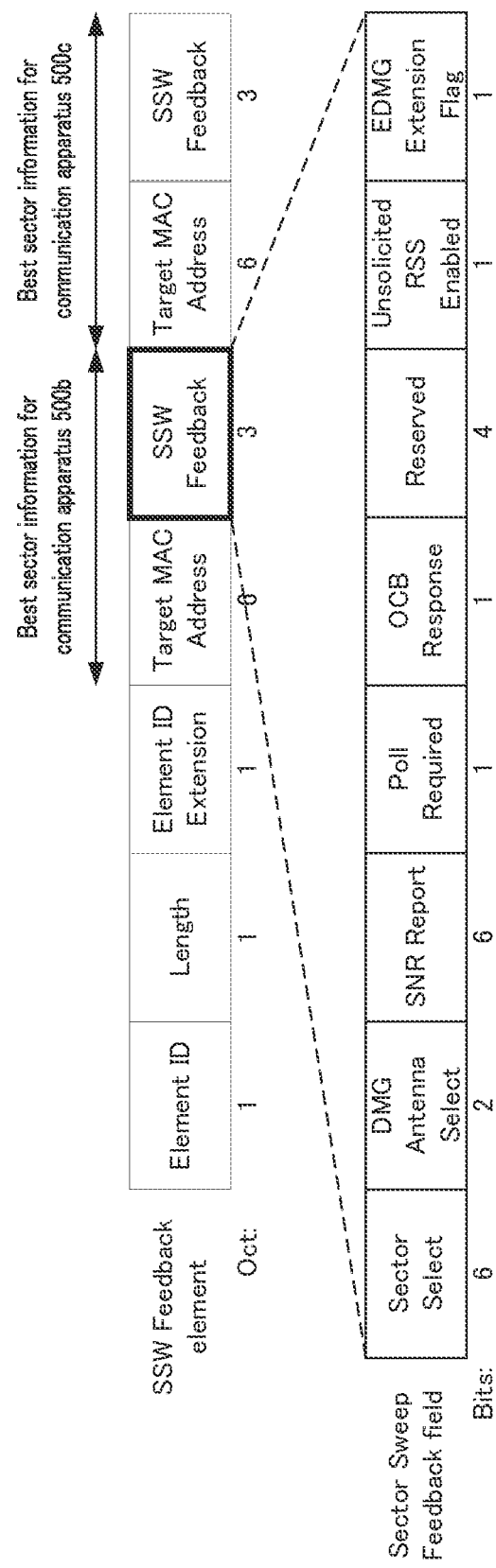
FIG. 12B illustrates an exemplary format of an SSW feedback element according to the variation of Embodiment 1.

FIG. 12A illustrates an exemplary format of the DMG beacon frame according to the variation of Embodiment 1. FIG. 12B illustrates an exemplary format of an SSW feedback element according to the variation of Embodiment 1. FIG. 12A illustrates a format of the DMG beacon frame transmitted by communication apparatus 500 in step S2002. The DMG beacon frame in FIG. 12A includes a DMG beacon sector feedback field in the DMG parameters field. In addition, the optional field includes one or more of SSW feedback elements illustrated in FIG. 12B. Descriptions will be omitted about fields and subfields that are the same as those included in the DMG beacon frame in FIG. 7A.

The DMG beacon sector feedback subfield includes a bit indicating whether to support reception of the SSW feedback element.

FIG. 12B illustrates a format of the SSW feedback element. The SSW feedback element includes an element ID field, length field, element ID extension, target MAC address field, and sector sweep (SSW) feedback field.

The element ID and element ID extension fields include information identifying the type of the element (indicating that it is the SSW feedback element) by the combination of values of the element ID and element ID extension fields.

The length field indicates the length (data length) of the element.

The target MAC address field includes the MAC address to which information in the sector sweep feedback field is to be indicated. For example, in a case where the sector sweep feedback field includes the best sector information for communication apparatus 500b, the target MAC address field includes the MAC address of communication apparatus 500b. Communication apparatus 500 may indicate the best sector information to a plurality of communication apparatuses by including a plurality of the target MAC address fields and a plurality of the sector sweep feedback fields in the SSW feedback element.

A format of the sector sweep feedback field is the same as that of the sector sweep feedback field in FIG. 8A, and the description thereof is thus omitted.

(Step S2003) The different communication apparatus that has received the DMG beacon frame in FIG. 12A (communication apparatus 500b for convenience) may check whether the target MAC address field in the SSW feedback element includes the MAC address of communication apparatus 500b and, if included, transmit a beam refinement protocol (BRP) frame to communication apparatus 500 to perform beamforming training. Communication apparatus 500 may perform beamforming training for transmission and reception antennas when receiving the BRP frame.

Communication apparatus 500b may perform the SLS by transmitting an SSW frame when communication apparatus 500 does not respond to the transmitted BRP frame.

(Step S2004) When the beamforming training by the BRP or SLS is completed in step S2003, communication apparatus 500 transmits and receives a data frame.

Figure 13:
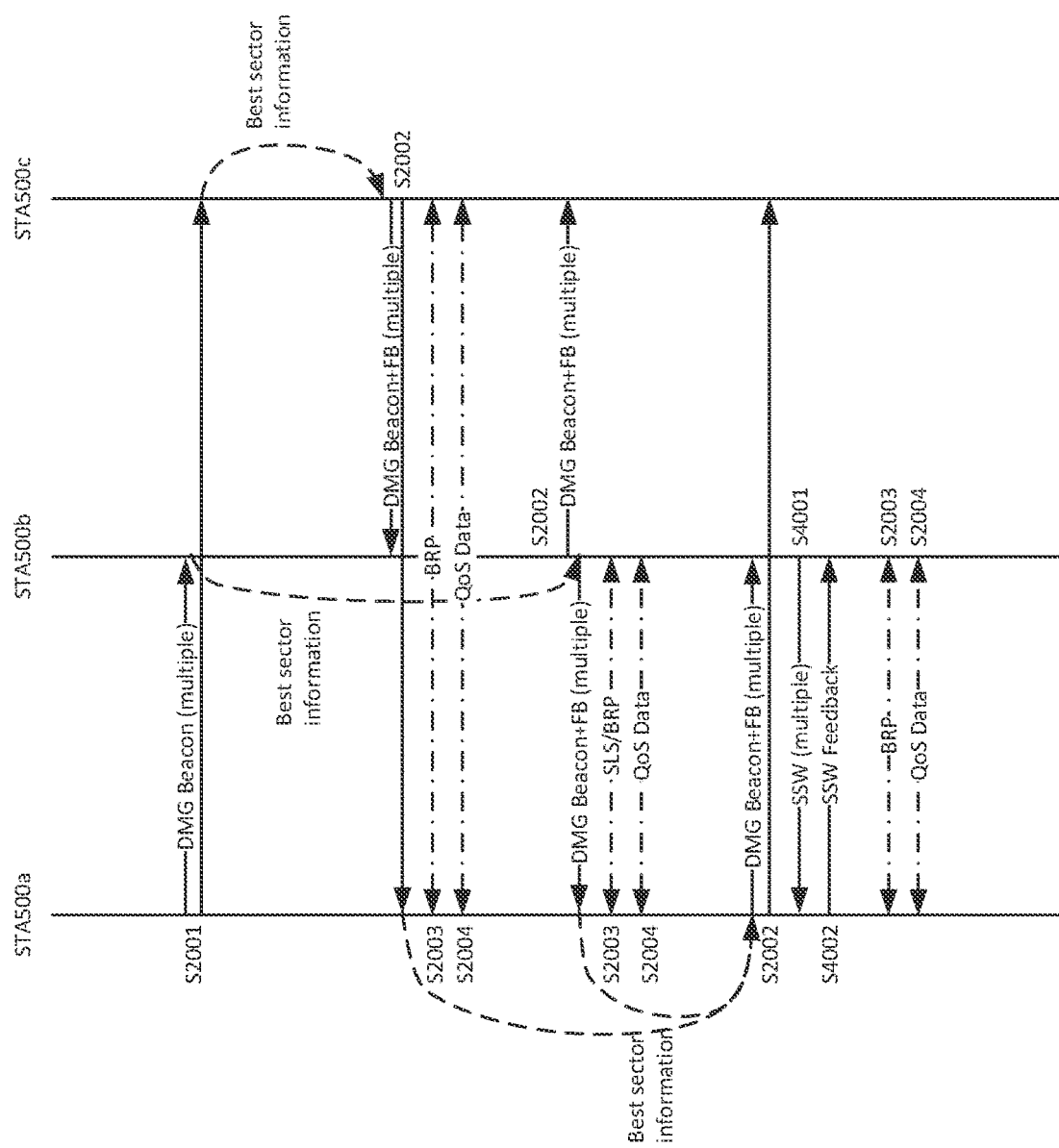
FIG. 13 is a sequence diagram describing an exemplary procedure for performing millimeter-wave communication by the communication apparatus according to the variation of Embodiment 1.

FIG. 13 is a sequence diagram describing an exemplary procedure for performing millimeter-wave communication by the communication apparatus according to the variation of Embodiment 1. With reference to FIG. 13, a detailed description will be given of a procedure for communication performed by communication apparatuses 500a, 500b, and 500c using the procedure in FIG. 11.

Communication apparatus 500a transmits a plurality of DMG beacon frames while changing the antenna directivity of a transmission antenna. Communication apparatus 500a may transmit the DMG beacon frames in FIG. 12A with the DMG beacon sector feedback subfields set to 1. Communication apparatuses 500b and 500c receive the DMG beacon frames and record the best sector information (corresponding to step S2001).

Communication apparatus 500c transmits the DMG beacon frames in FIG. 12A including the best sector information for communication apparatus 500a in the SSW feedback elements in FIG. 12B (corresponding to step S2002). Communication apparatuses 500a and 500b receive the DMG beacon frames, check whether the addresses of communication apparatuses 500a and 500b are included in the target MAC address fields of the SSW feedback elements, and acquire the best sector information.

Communication apparatus 500a configures the directivity of antenna 101 using the best sector information included in the received DMG beacon frame, and transmits the BRP frame to communication apparatus 500c. Communication apparatus 500c receives the BRP frame and performs beamforming training with communication apparatus 500a (corresponding to step S2003).

Note that, in step S2003, communication apparatus 500a may transmit the BRP frame after transmitting a probe request frame to communication apparatus 500c, receiving a probe response frame, and acquiring detailed information (capability information) of communication apparatus 500c. This makes it possible to transmit and receive the BRP and a data frame using a BRP extension function and a MIMO function based on information indicating whether the BRP extension function and the MIMO function are supported, which is included in the detailed information of communication apparatus 500c, thereby shortening the beamforming training time and performing the data communication efficiently.

When the BRP is completed, communication apparatuses 500a and 500c transmit and receive data frames (corresponding to step S2004).

Similar to communication apparatus 500c, communication apparatus 500b transmits DMG beacon frames including the best sector information for communication apparatus 500a (corresponding to step S2002), performs the BRP (corresponding to step S2003), and performs data communication (corresponding to step S2004).

Note that, when receiving the SSW feedback element (corresponding to step S2002), communication apparatus 500 may transmit the SSW frame and perform beamforming training by the SLS (step S4001).

Communication apparatus 500a transmits the DMG beacon frames including the best sector information for communication apparatuses 500b and 500c in the SSW feedback elements (corresponding to step S2002).

Communication apparatus 500b selects 16 sectors (directivities), for example, based on the received best sector information, and transmits 16 SSW frames (step S4001). By way of example, communication apparatus 500b may select a single sector number included in the best sector information and 15 sectors having directivities close to the best sector, and use the selected sectors to transmit the SSW frames in step S4001.

When receiving the SSW frames, communication apparatus 500a transmits the SSW feedback frames to communication apparatus 500b (step S4002). Further, communication apparatuses 500a and 500b perform the BRP (corresponding to step S2003), and perform data communication (corresponding to step S2004).

Note that, in step S2002, communication apparatus 500a may eliminate the transmission of the best sector information to communication apparatus 500 with which a radio link has already established. This allows communication apparatus 500a to reduce the amount of data in the DMG beacon frame, shorten transmission-related delay, and reduce interference with another communication apparatus 500.

By way of example, communication apparatus 500a has established radio links with communication apparatuses 500b and 500c in step S2003, and thus communication apparatus 500a may transmit the DMG beacon frames without including the best sector information for communication apparatuses 500b and 500c. Note that communication apparatus 500 may eliminate the procedure of steps S4001 and S4002 in this case.

Communication apparatus 500 may transmit the DMG beacon frames at a predetermined time period. That is, communication apparatus 500 may periodically perform step S2001 or S2002. This period (beacon interval) may be randomly selected each time step S2001 or S2002 is performed between 10 TUs and less than 200 TUs.

As described above, communication apparatus 500 transmits the DMG beacon frames including the best sector information (step S2002), and establishes a radio link without transmitting and receiving the SSW frame to perform the BRP, thereby reducing the delay before the start of transmission and reception of the data frame and reducing interference with another communication apparatus 500 caused by the transmission of the SSW frame.

Further, communication apparatus 500 performs the SLS by reducing the number of SSW frame transmission times based on the best sector information, thereby reducing the delay before the start of transmission and reception of the data frame and reducing interference with another communication apparatus 500 caused by the transmission of the SSW frame.

Embodiment 2

Figure 14:
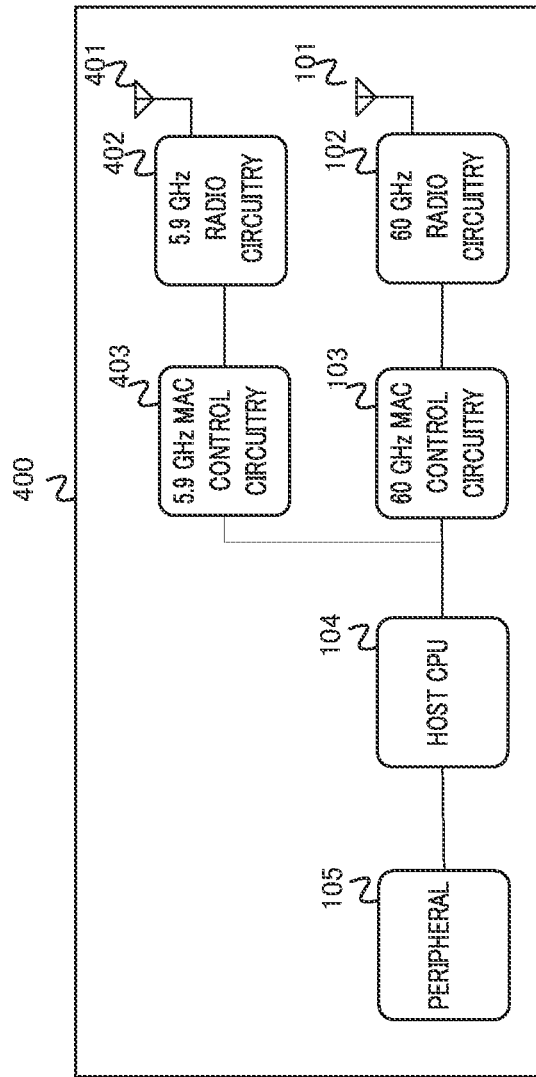
FIG. 14 illustrates an exemplary configuration of a communication apparatus according to Embodiment 2.

FIG. 14 illustrates an exemplary configuration of communication apparatus 400 according to Embodiment 2. Communication apparatus 400 includes 60 GHz antenna 101a, 60 GHz radio circuitry 102a, 60 GHz MAC control circuitry 103a, host CPU 104, peripheral 105, 5.9 GHz antenna 401, 5.9 GHz radio circuitry 402, and 5.9 GHz MAC control circuitry 403. The components similar to those of communication apparatuses 100 and 300 in FIG. 2 are assigned the same reference signs as in FIG. 2, and the descriptions thereof are omitted. Note that, although 60 GHz antenna 101a, 60 GHz radio circuitry 102a, and 60 GHz MAC control circuitry 103a are components operating the same as antenna 101, radio circuitry 102, and MAC control circuitry 103 in FIG. 2, they are specified as "60 GHz" in FIG. 14 in order to distinguish the components for a 60 GHz band from the components for a 5.9 GHz band.

Communication apparatus 400 can transmit low-volume data to a large number of communication apparatuses in a wide range (situation as in FIG. 1A) by performing broadcast transmission using an omni-directional antenna in the 5.9 GHz band. In radio communication in the 5.9 GHz band, communication apparatus 400 need not discover a destination communication apparatus since it performs the broadcast transmission, and the use of the omni-directional antenna eliminates the need for beamforming training, thereby reducing delay before the start of data communication. Further, communication apparatus 400 includes a communication function for the 60 GHz band, thus enabling large-capacity communication.

5.9 GHz antenna 401 transmits and receives a radio signal in the 5.9 GHz band. 5.9 GHz antenna 401 may be an omni-directional antenna. 5.9 GHz radio circuitry 402 transmits and receives a radio signal compliant with a physical layer of a communication standard for the 5.9 GHz band, for example, the IEEE 802.11p standard. 5.9 GHz MAC control circuitry 403 performs MAC control complying with a MAC layer of a communication standard for the 5.9 GHz band, for example, the IEEE 802.11p standard and IEEE 1609 standard.

Although the IEEE 802.11p is exemplified as the standard with which 5.9 GHz radio circuitry 402 complies, the standard may be the IEEE 802.11-2016, dedicated short range communications (DSRC) standard, long term evolution-V2X (LTE-V2X), or cellular V2X (C-V2X), as other examples. In addition, 5.9 GHz band is exemplified as a band where 5.9 GHz radio circuitry 402 performs radio communication, the band may be a 760 MHz band (association of radio industries and businesses (ARIB) standard (STD) T109), 2.4 GHz band and 5 GHz band, or 6 GHz band wireless LAN (Wi-Fi and IEEE 802.11), as other examples.

Although the IEEE 802.11p and IEEE 1609 are exemplified as the standard with which 5.9 GHz MAC circuitry 403 complies, the standard may be the IEEE 802.11-2016, wireless access in vehicular environment (WAVE) standard, LTE-V2X, or C-V2X, as other examples. Further, in a case where 5.9 GHz radio circuitry 402 operates in a frequency band other than 5.9 GHz complying with, for example, a 760 MHz band (ARIB STD-T109), 2.4 GHz band and 5 GHz band, or 6 GHz band wireless LAN (Wi-Fi or IEEE 802.11), 5.9 GHz MAC control circuitry 403 may perform a MAC control operation compliant with the corresponding standard.

Figure 15:
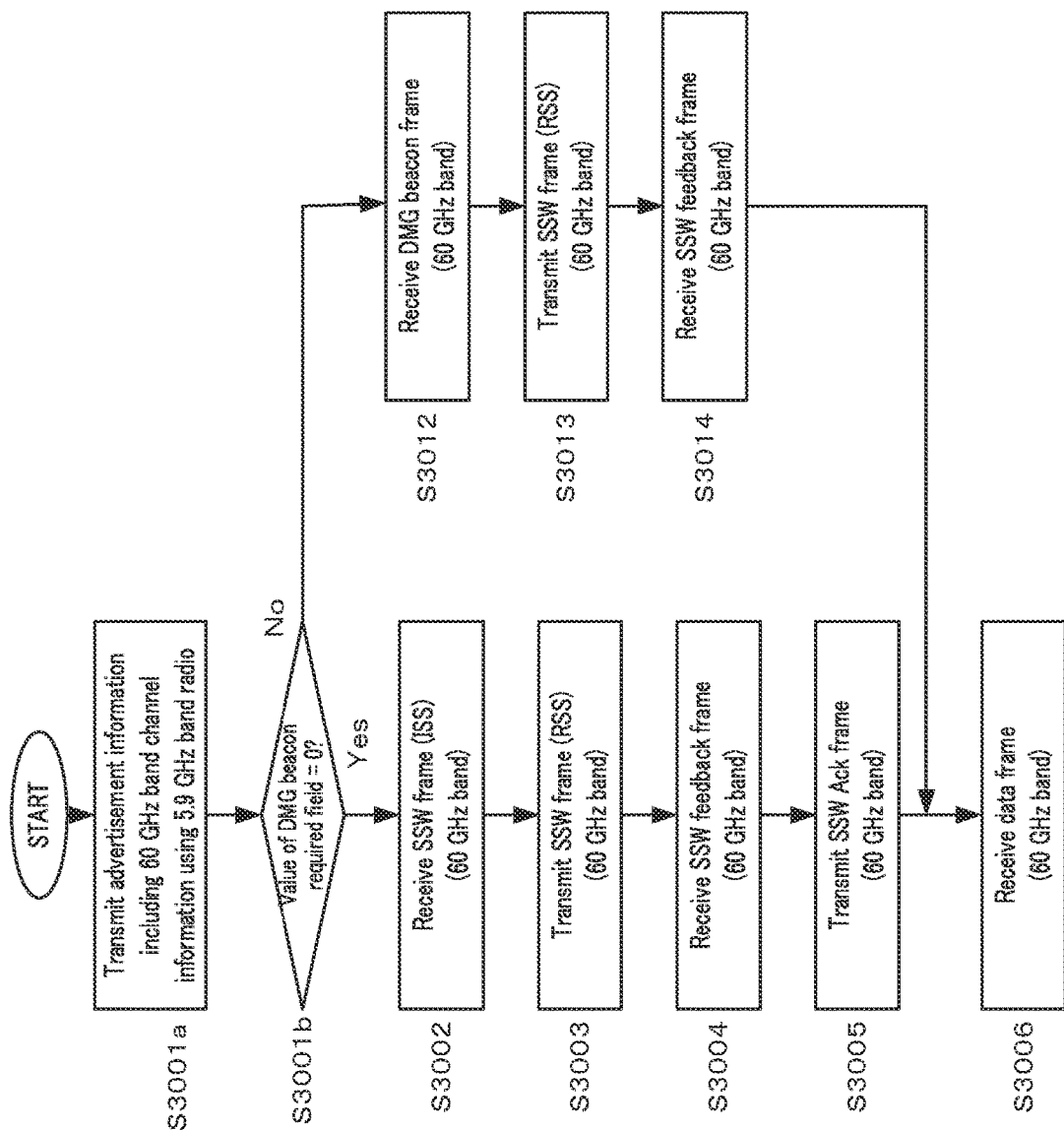
FIG. 15 is a flowchart describing an exemplary procedure for performing millimeter-wave communication by the communication apparatus according to Embodiment 2.

FIG. 15 is a flowchart describing an exemplary procedure for performing millimeter-wave communication by the communication apparatus according to Embodiment 2. FIG. 15 illustrates a procedure for communication apparatus 400 to perform communication in V2X communication system 1.

(Step S3001a) communication apparatus 400 transmits, using the 5.9 GHz band radio, advertisement information including information on a channel communicating in the 60 GHz band. The advertisement information may be included in a WAVE service advertisement (WSA) frame described in the IEEE 1609.3-2016 standard (NPL 2).

Figure 16:
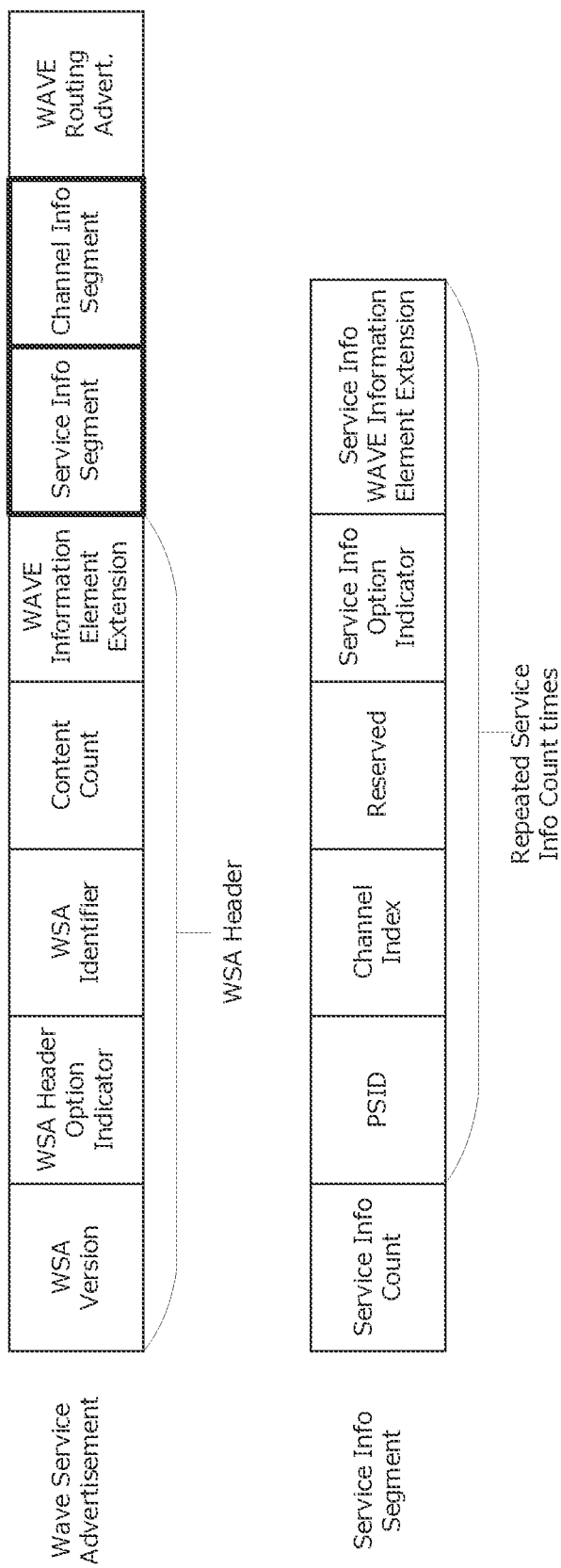
FIG. 16 illustrates an exemplary format of a WSA frame according to Embodiment 2.

FIG. 16 illustrates an exemplary format of the WSA frame according to Embodiment 2. A description will be given of an exemplary format of the WSA frame including information of a 60 GHz band channel illustrated in FIG. 16. The WSA frame includes a WSA version field, WSA header option indicator field, WSA identifier field, content count field, WAVE information element extension field, service info segment, channel info segment, and WAVE routing advertisement (advert).

The WSA version field indicates version information of the WSA frame. The WSA header option indicator field indicates whether each of the WAVE information element extension field, service info segment, channel info segment, and WAVE routing advertisement field, which are optional fields, is included in the WSA frame.

The WSA identifier field indicates identification information of the WSA frame. Communication apparatus 400 may repeatedly transmit WSA frames including the same value, but when transmitting a WSA frame different from the previous one, communication apparatus 400 sets a value different from the previous one in the WSA identifier field. When repeatedly transmitting the same WSA frame as the previous one, communication apparatus 400 may transmit the WSA frames while increasing the value of the content count field.

The WAVE information element extension fields can include a plurality of information elements and may include information on services provided by 5.9 GHz communication and 60 GHz communication.

The service info segment includes a service info count field, PSID field, channel index field, reserved bit, service info option indicator field, and service info WAVE information element extension field.

The service info segment may include a plurality of sets of fields except for the service info count field. The service info count field indicates how many sets of the following fields (from the PSID to the WAVE information element extension field) are included.

The provide service identifier (PSID) field includes a value for applications provided in the 5.9 GHz communication and 60 GHz communication. The correspondence between the PSID value and the content is specified in the IEEE 1609.12 standard.

The channel index field includes a value indicating by which radio channel the service indicated from the PSID to the WAVE information element extension field in the service info segment is provided. By way of example, a channel info segment (to be described later) in the WSA frame includes a set of four channel information portions and the value of the channel index field is 2, it indicates that the service is provided in a channel indicated by the second information portion in the channel info segment in the WSA frame.

The service info option indicator field indicates whether the service info WAVE information element extension field, which is a following field, is included.

The service info WAVE information element extension field includes information on the provided service as in the WAVE information element extension field described above, but includes information on the service specific to a channel specified by the channel index field.

Figure 17:
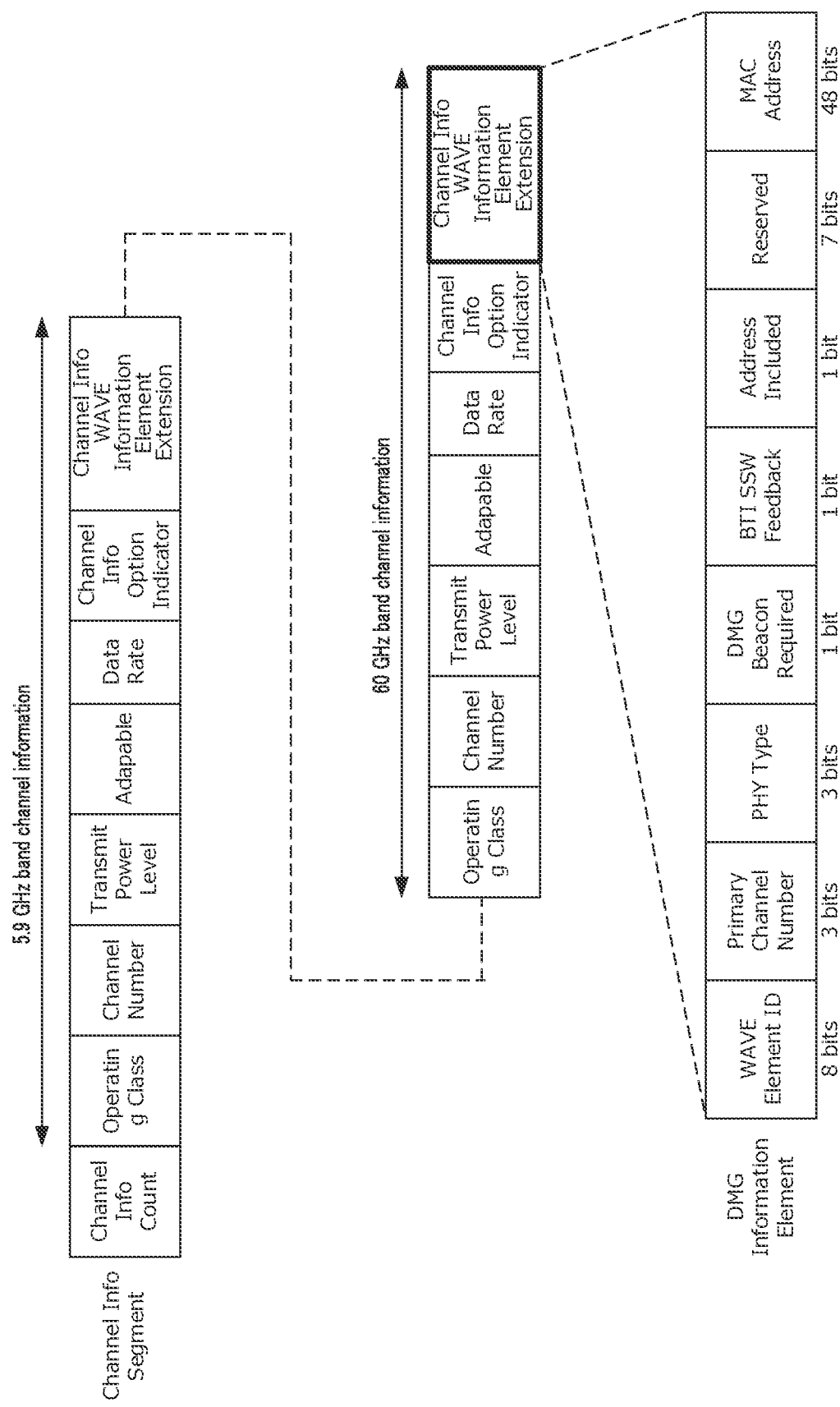
FIG. 17 illustrates an exemplary format of a channel info segment according to Embodiment 2.

FIG. 17 illustrates an exemplary format of the channel info segment according to Embodiment 2. The channel info segment includes a channel info count field, operating class field, channel number field, transmit power level field, adaptable field, data rate field, channel info option indicator field, and channel info WAVE information element extension field.

The channel info segment may include a plurality of sets (hereinafter referred to as channel information) from the operating class field to the channel info WAVE information element extension field except for the channel info count field, and the channel info count field indicates the number of sets.

The WSA frame in FIG. 16 includes, for example, two channel information portions for the 5.9 GHz band and the 60 GHz band, and the value of the channel info count field is 2.

The operating class field includes a number for identifying a set of frequency bands or channels as defined in the IEEE 802.11 standard. By way of example, in a case of performing communication with a channel width of 10 MHz in the 5.9 GHz band in the U.S., the value of the operating class field for the 5.9 GHz band channel information is 17. As another example, in a case of performing communication with a channel width of 2.16 GHz in the 60 GHz band in Japan, the value of the operating class field for the 60 GHz band channel information is 59.

The channel number field includes a channel number in an operating class as defined in the IEEE 802.11 standard. By way of example, in the operating class 17 in the U.S., the value of the channel number field for the 5.9 GHz band information is any of the values 171 to 184. As another example, in the operating class 59 in Japan, the value of the channel number field is any of the values 1 to 29.

The transmit power level field includes a value (unit: dBm) of transmit power (equivalent isotropically radiated power (EIRP)) in the channel.

The adaptable field is used in conjunction with the data rate field. When the value of the adaptable field is 1, the value of the data rate field indicates the minimum data rate for communication apparatus 400 to perform transmission. When the value of the adaptable field is 0, communication apparatus 400 performs transmission at a fixed data rate corresponding to the value of the data rate field.

Note that the value indicated in the data rate field is 1 Mbit/s or more and 63.5 Mbits/s or less in the IEEE 1609.3 standard. The value of the data rate field may be read in accordance with the value of the operating class field. For example, in a case where the value of the operating class field indicates the 60 GHz band, such as 59 in Japan, the value of the data rate field may be read as 1000 times the value for the 5.9 GHz band, and may be considered to indicate a value ranging from 1 Gbit/s to 63.5 Gbits/s.

As another example, in the 60 GHz channel information, the value of the data rate field may be set to a value equal to or more than 63.5 Mbits/s, which is the maximum value, and a subfield indicating the data rate in the 60 GHz band channel may be included in the channel info optional WAVE information element extension field, which will be described later.

The channel info option indicator field indicates whether the channel information includes the channel info WAVE information element extension field.

The channel info WAVE information element extension field includes information on the provided service as in the WAVE information element extension field (see FIG. 16) described above, but includes information on the service specific to the channel specified by the operating class field and the channel number field.

When transmitting the WSA frame with the information on the 60 GHz band channel included, communication apparatus 400 includes the DMG information element illustrated in FIG. 17 in the channel info WAVE information element extension field and transmits the WSA frame.

The DMG information element includes a WAVE element ID field, primary channel number field, PHY type field, DMG beacon required field, BTI SSW feedback field, address included field, reserved bits, and MAC address field.

The WAVE element ID field indicates an identification number indicating a type of element (DMG information element in FIG. 17).

The primary channel number field indicates a primary channel number in the 60 GHz.

The PHY type field indicates a radio communication standard that communication apparatus 400 uses in the 60 GHz band. The value of 0 in the PHY type field represents the IEEE 802.11ad standard (directional multi gigabit (DMG)), and the value of 1 in the PHY type field represents the IEEE 802.11 ay standard (enhanced directional multi gigabit (EDMG)). Other values, 2 to 7, are reserved for future standards.

The DMG beacon required field indicates whether communication apparatus 400 needs to receive a DMG beacon frame first in a case of communicating with another communication apparatus that has received the WSA frame in FIG. 16. Details will be described later.

The BTI SSW feedback field indicates whether communication apparatus 400 supports the scheme of performing the SSW feedback using the DMG beacon in FIG. 11.

The address included field indicates whether the MAC address field is included.

The MAC address field indicates a MAC address used by communication apparatus 400 in the 60 GHz band. In a case where the value of the address included field is 0, which means not including the MAC address field, communication apparatus 400 uses the MAC address for the 5.9 GHz band, which is included in a header (not illustrated) of the WSA frame, in the 60 GHz band as well. Note that, in the 60 GHz band, communication apparatus 400 may use the same MAC address as that for the 5.9 GHz band or may use a different MAC address.

Step S3001*b* and subsequent steps in FIG. 15 will be described. A different communication apparatus that has received a WSA frame (advertisement information) transmits a frame in the primary channel indicated by the primary channel number field in a case where the different communication apparatus supports an operation in the frequency band in the operating class indicated in the operating class field and supports the communication standard indicated in the PHY type field.

In a case where communication apparatus 400 transmits the WSA frame with the DMG beacon required field set to 0 (Yes in step S3001*b*), it receives an SSW frame from the different communication apparatus (step S3002). In a case where communication apparatus 400 transmits the WSA frame with the DMG beacon required field set to 1 (No in step S3001*b*), it receives a DMG beacon frame from the different communication apparatus (step S3012). Note that, when the WSA frame including no channel information for the 60 GHz band is received in step S3001*b*, the association procedure for the PBSS/BSS may be performed.

After receiving the SSW frame for ISS in step S3002, communication apparatus 400 responds by transmitting an SSW frame for RSS (step S3003). After the different communication apparatus responds to the SSW frame for RSS and communication apparatus 400 receives an SSW feedback frame (step S3004), communication apparatus 400 transmits an SSW Ack frame and indicates that the SLS has succeeded to the different communication apparatus (step S3005).

Figure 18:
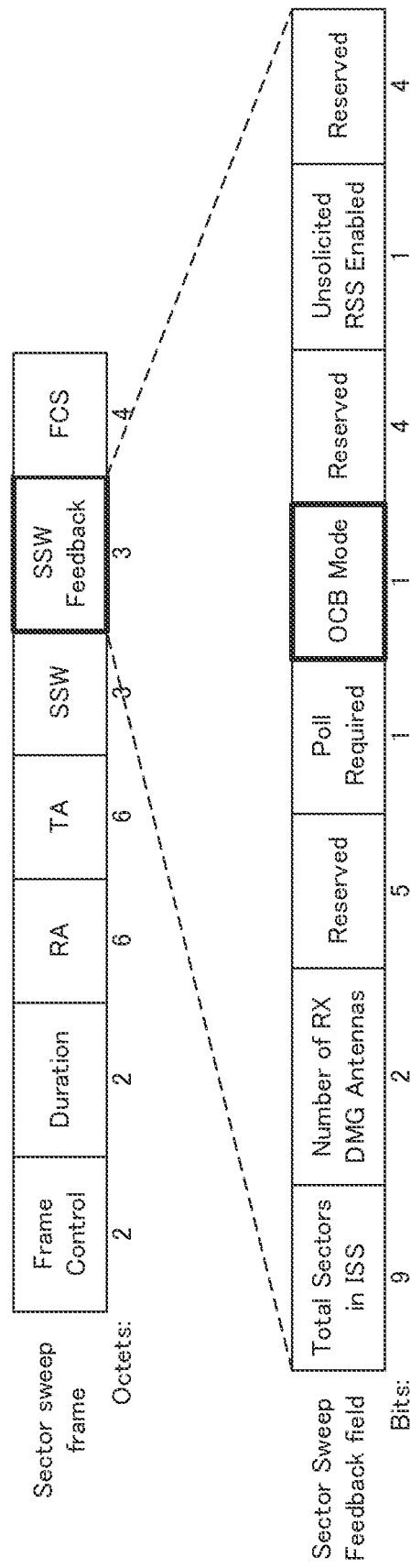
FIG. 18 illustrates an exemplary format of an SSW frame according to Embodiment 2.

FIG. 18 illustrates an exemplary format of the SSW frame according to Embodiment 2. With reference to FIG. 18, a description will be given of a format of the SSW frame transmitted by communication apparatus 400 in step S3002. The SSW frame in FIG. 18 includes the OCB mode subfield in the SSW feedback field. Descriptions will be omitted about the other fields and subfields in the SSW frame (see NPL 1).

Communication apparatus 400 transmits the SSW frame with the OCB mode subfield set to 1 in step S3002 in a case of supporting the OCB mode. A different communication apparatus 400 may transmit the SSW frame in FIG. 8A with the OCB response subfield set to 1 in step S3003 in a case of supporting the OCB mode.

After receiving the DMG beacon frame in step S3012, communication apparatus 400 responds by transmitting the SSW frame for RSS (step S3013). The SLS is successful when the different communication apparatus responds to the SSW frame for RSS and communication apparatus 400 receives the SSW feedback frame from the different communication apparatus (step S3014).

In step S3012, communication apparatus 400 may transmit the DMG beacon frame in FIG. 7A with the OCB mode subfield set to 1. In step S3013, the different communication apparatus 400 may transmit the SSW frame in FIG. 8A with the OCB response subfield set to 1.

When the SLS with the different communication apparatus is successful in step S3005 or S3014, communication apparatus 400 receives a 60 GHz band data frame from the different communication apparatus. Note that communication apparatus 400 may transmit a data frame to the different communication apparatus in step S3006.

Figure 19:
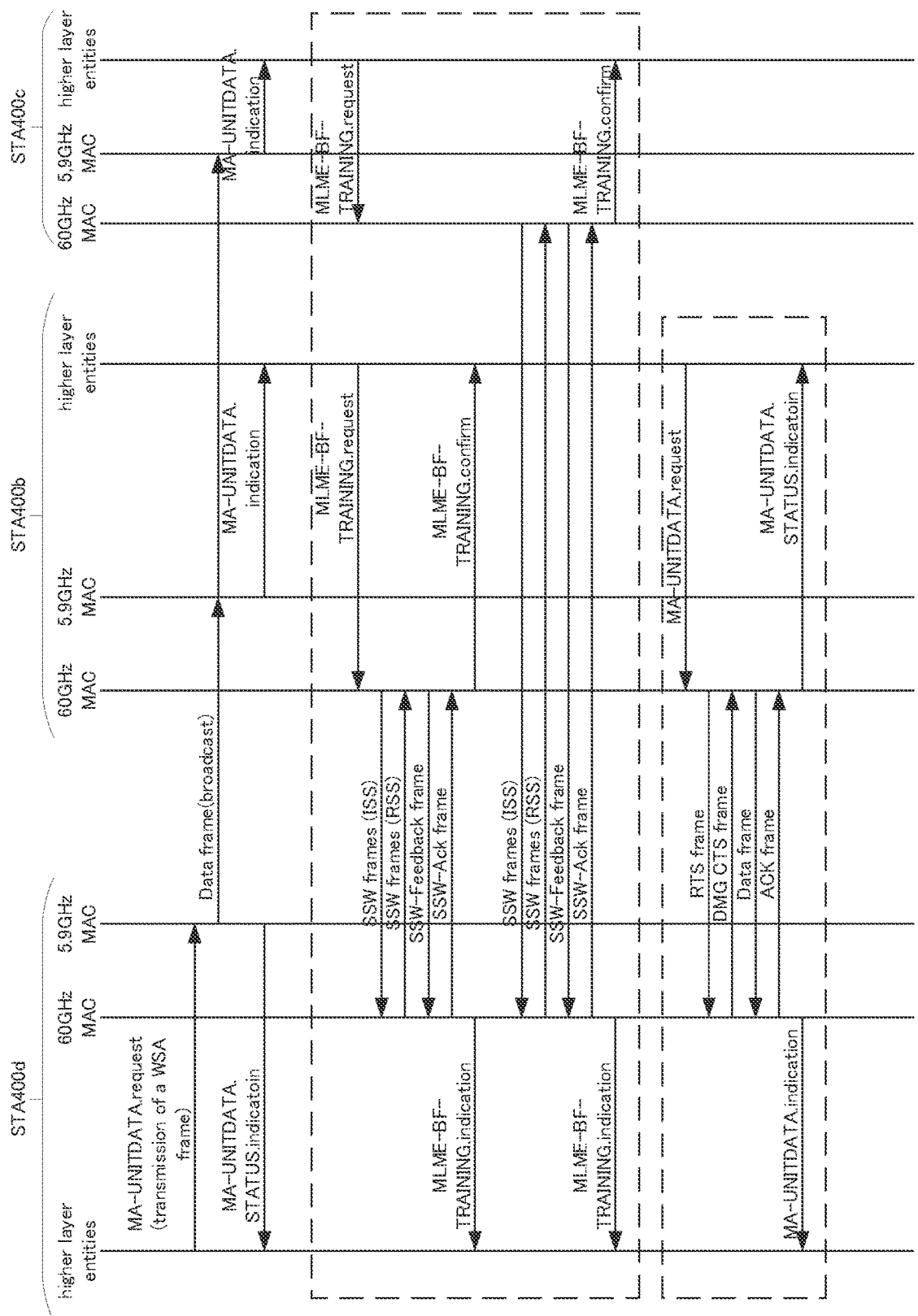
FIG. 19 is a sequence diagram describing an exemplary procedure for performing millimeter-wave communication by the communication apparatus according to Embodiment 2.

FIG. 19 is a sequence diagram describing an exemplary procedure for performing millimeter-wave communication by the communication apparatus according to Embodiment 2. With reference to FIG. 19, a description will be given of a method for communication apparatus 400d to communicate with a plurality of other communication apparatuses 400b and 400c using the procedure in FIG. 2.

In FIG. 19, the "higher layer entities" represent the operation of host CPU 104, by way of example. The "higher layer entities" may be, for example, software such as a station management entity (SME), supplicant, driver, OS, and IEEE 1609 standard compliant software.

Note that communication apparatus 400 may run the IEEE 1609 compliant software on 60 GHz MAC control circuitry 103 and 5.9 GHz MAC control circuitry 403. Further, communication apparatus 400 may include MAC control circuitry 413 (not illustrated) to perform common processing performed by 60 GHz MAC control circuitry 103 and 5.9 GHz MAC control circuitry 403, and may run the IEEE 1609 compliant software on MAC control circuitry 413.

In FIG. 19, the "60 GHz MAC" represents the operation of 60 GHz MAC control circuitry 103. In addition, the "5.9 GHz MAC" represents the operation of 5.9 GHz MAC control circuitry 403.

The sequence diagram of FIG. 19 eliminates the description of operations of components other than the "higher layer entities", "5.9 GHz MAC", and "60 GHz MAC" (e.g., operations of 5.9 GHz radio circuitry 402 and 60 GHz radio circuitry 102).

The higher layer entities of communication apparatus 400d generate a WSA frame including the 5.9 GHz band channel information and the 60 GHz band channel information in FIG. 16 and FIG. 17, issues an MA-UNITDATA.request primitive, and request transmission of a WSA frame from the 5.9 GHz MAC.

The 5.9 GHz MAC of communication apparatus 400d performs broadcast transmission of the WSA frame in 5.9 GHz band radio communication. The broadcast transmission allows a plurality of communication apparatuses to receive frame data, and thus communication apparatuses 400b and 400c receive the WSA frame (corresponding to step S3001a).

After receiving the WSA frame, the 5.9 GHz MAC of each of communication apparatuses 400b and 400c issues an MA-UNITDATA.indication primitive, and indicates the data reception and the data of the WSA frame to its higher layer entities.

The higher layer entities of each of communication apparatuses 400b and 400c start 60 GHz band communication based on the channel information included in the received WSA frame. When the value of the received DMG beacon required field is 0, the higher layer entities of each of communication apparatuses 400b and 400c issue an MLME-BF-TRAINING.request primitive and request the SLS processing to its 60 GHz MAC (corresponding to step S3002).

The higher layer entities of each of communication apparatuses 400b and 400c configure a parameter of the MLME-BF-TRAINING.request primitive based on information included in the primary channel number field of the WSA frame so that beamforming is performed on a specified primary channel in the 60 GHz band. In addition, the higher layer entities of each of communication apparatuses 400b and 400c determine the destination of an SSW frame based on the address included field and MAC address field (if present) of the WSA frame, and configure the destination as a parameter of the MLME-BF-TRAINING.request primitive.

The 60 GHz MAC of each of communication apparatuses 400b and 400c transmits the SSW frame (ISS) (corresponding to step S3003), receives an SSW frame (RSS) (corresponding to step S3004), and then transmits an SSW feedback frame (corresponding to step S3005), which completes the SLS.

The 60 GHz MAC of each of communication apparatuses 400b and 400c may start transmitting the SSW frame (ISS) after waiting for a random amount of time from the reception of the MLME-BF-TRAINING.request primitive so that the transmissions of the SSW frames do not conflict with each other. In addition, the higher layer entities of each of communication apparatuses 400b and 400c may issue the MLME-BF-TRAINING.request primitive after waiting for a random amount of time from the reception of the WSA frame.

After the SLS is completed, the 60 GHz MAC of each of communication apparatuses 400b and 400c issues an MLME-BF-TRAINING.confirm primitive to indicate the completion of the beamforming training to the higher layer entities. Further, the 60 GHz MAC of communication apparatus 400d issues an MLME-BF-TRAINING.indication primitive to indicate the beamforming training to the higher layer entities.

Data communication is enabled between the communication apparatuses that have completed the beamforming training. For example, in FIG. 19, the higher layer entities of communication apparatus 400b issue an MA-UNITDATA.request primitive and request data transmission from the 60 GHz MAC. The 60 GHz MAC of communication apparatus 400b completes the data transmission by transmitting an RTS frame, receiving a DMG CTS frame, transmitting a data frame, and receiving an Ack frame. The 60 GHz MAC of communication apparatus 400b issues an MA-UNITDATA.STATUS.indication primitive to indicate the completion of the data transmission to the higher layer entities.

The 60 GHz MAC of communication apparatus 400*d* issues an MA-UNITDATA.indication primitive to indicate the data reception in the 60 GHz band to the higher layer entities.

Communication apparatus 400*d* does not perform association in the sequence of FIG. 19, thereby shortening the delay and starting the data transmission to communication apparatuses 400*b* and 400*c* early. In addition, communication apparatus 400*d* performs broadcast transmission in the 5.9 GHz by including the 60 GHz band channel information, MAC address, and primary channel information in the advertisement information. This allows communication apparatus 400*d* to perform beamforming by receiving an SSW frame (FIG. 18), which has a frame length shorter than that of a DMG beacon frame (see NPL 1), resulting in shorter delay before the start of the data transmission in the 60 GHz band.

As described above, communication apparatus 400 can transmit low-volume data to a large number of communication apparatuses in a wide range by performing the broadcast transmission using an omni-directional antenna in the 5.9 GHz band. In radio communication in the 5.9 GHz band, communication apparatus 400 need not discover a destination communication apparatus since it performs the broadcast transmission, and the use of the omni-directional antenna eliminates the need for beamforming training, thereby reducing delay before the start of data communication. Further, communication apparatus 400 includes a communication function for the 60 GHz band, thus enabling large-capacity communication.

In the embodiments described above, " . . . er (or)" used for each component may be replaced with another term such as " . . . circuit (circuitry)", " . . . device", " . . . unit" and " . . . module".

Although various embodiments have been described above with reference to the drawings, the present disclosure is not limited to foregoing embodiments. It is obvious that those skilled in the art can conceive various modifications or variations within the scope recited in the claims, and such modifications and variations also naturally fall within the technical scope of the present disclosure. Further, any components in the embodiments described above may be combined as appropriate without departing from the gist of the present disclosure.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Summary of Present Disclosure

A communication apparatus according to the present disclosure includes: media access control (MAC) control circuitry, which, in operation, controls transmission and reception of a control frame and a data frame that are used for communication with another communication apparatus; and radio circuitry, which, in operation, performs radio communication of the control frame and the data frame using a transmission antenna and a reception antenna, wherein, when the radio circuitry receives, from the another communication apparatus, a sector sweep (SSW) frame including an outside a context of a BSS (OCB) response subfield among a plurality of the control frames, the MAC control circuitry determines whether to perform data communication between the communication apparatus and the another communication apparatus in accordance with the OCB response subfield.

In the communication apparatus according to the present disclosure, when the MAC control circuitry determines not to perform the data communication between the communication apparatus and the another communication apparatus, the MAC control circuitry performs sector level sweep (SLS) or a beam refinement protocol (BRP), and controls antenna directivity training for the transmission antenna and the reception antenna with respect to the another communication apparatus.

In the communication apparatus according to the present disclosure, when the MAC control circuitry determines to perform the data communication between the communication apparatus and the another communication apparatus, the MAC control circuitry performs a personal basic service set (PBSS), and controls the antenna directivity training for the transmission antenna and the reception antenna with respect to the another communication apparatus.

A communication method according to the present disclosure includes: receiving, by a reception antenna of radio circuitry of a communication apparatus from another communication apparatus, a sector sweep (SSW) frame including an outside a context of a BSS (OCB) response subfield among a plurality of control frames used for communication with the another communication apparatus; and determining, by MAC control circuitry that controls transmission and reception of at least one of the control frames and a data frame, whether to perform data communication between the communication apparatus and the another communication apparatus in accordance with the OCB response subfield.

In the communication method according to the present disclosure, when the MAC control circuitry determines not to perform the data communication between the communication apparatus and the another communication apparatus, the MAC control circuitry performs sector level sweep (SLS) or a beam refinement protocol (BRP), and controls training for a transmission antenna and the reception antenna with respect to the another communication apparatus.

In the communication method according to the present disclosure, when the MAC control circuitry determines to perform the data communication between the communication apparatus and the another communication apparatus, the MAC control circuitry performs a personal basic service set (PBSS), and controls the training for the transmission antenna and the reception antenna with respect to the another communication apparatus.

The present application claims a priority on the basis of Japanese Patent Application No. 2020-058830, filed on Mar. 27, 2020. The disclosure of Japanese Patent Application No. 2020-058830 including the specification, drawings and abstract, is incorporated herein by reference in its entirety.

INDUSTRIAL APPLICABILITY

The present disclosure is suitable for millimeter-wave communication using a communication apparatus mounted on a high-speed moving body, for example.

REFERENCE SIGNS LIST 10 (10a to 10m) Vehicle
100 (100a to 100m), 200, 300, 400, 500 Communication apparatus
30 Roadside unit
20 Pedestrian
101 Antenna
102 Radio circuitry
103 MAC control circuitry
104 Host CPU
105 Peripheral
1001 PBSS
401 5.9 GHz antenna
402 5.9 GHz radio circuitry
403 5.9 GHz MAC control circuitry

The invention claimed is:

1. A communication apparatus, comprising:
media access control (MAC) control circuitry, which, in operation, controls transmission and reception of a control frame and a data frame that are used for communication with another communication apparatus; and
radio circuitry, which, in operation, performs transmission and reception using a transmission antenna with directivity and a reception antenna, wherein,
the radio circuitry transmits a Beacon frame or first sector sweep (SSW) frame including a first outside a context of a BSS (OCB) mode subfield,
the radio circuitry receives, from the another communication apparatus, a second SSW frame including a second OCB response subfield among a plurality of the control frames,
the radio circuitry transmits an SSW feedback frame to the another communication apparatus,
the MAC control circuitry determines whether to perform data communication in OCB mode between the communication apparatus and the another communication apparatus in accordance with the second OCB response subfield, and
when the second OCB response subfield indicates the OCB is enabled, the radio circuitry transmits the data frame in OCB mode using the transmission antenna with directivity.

2. The communication apparatus according to claim 1, wherein, when the MAC control circuitry determines not to perform the data communication between the communication apparatus and the another communication apparatus, the MAC control circuitry performs sector level sweep (SLS) or a beam refinement protocol (BRP), and controls antenna directivity training for a transmission antenna and a reception antenna with respect to the another communication apparatus.

3. The communication apparatus according to claim 2, wherein, when the MAC control circuitry determines to perform the data communication based on a personal basic service set (PBSS) between the communication apparatus and the another communication apparatus, the MAC control circuitry controls the antenna directivity training for the transmission antenna and the reception antenna with respect to the another communication apparatus.

4. The communication apparatus according to claim 1, wherein the second OCB response subfield is set to 1 to indicate the OCB is enabled.

5. A communication method to support transmission and reception using a transmission antenna with directivity and a reception antenna, the communication method comprising:
transmitting, from a transmission antenna of radio circuitry of a communication apparatus to another communication apparatus, a Beacon frame or first sector sweep (SSW) frame including a first outside a context of a BSS (OCB) mode subfield;
receiving, by a reception antenna of radio circuitry of the communication apparatus from the another communication apparatus, a second SSW frame including a second OCB response subfield among a plurality of control frames used for communication with the another communication apparatus;

transmitting, from the transmission antenna, an SSW feedback frame to the another communication apparatus;

determining, by media access control (MAC) control circuitry that controls transmission and reception of at least one of the control frames and a data frame, whether to perform data communication in OCB mode between the communication apparatus and the another communication apparatus in accordance with the second OCB response subfield; and when the OCB response subfield indicates the OCB is enabled, transmitting, from the transmission antenna, the data frame in OCB mode using the transmission antenna with directivity.

6. The communication method according to claim 5, wherein, when the MAC control circuitry determines not to perform the data communication between the communication apparatus and the another communication apparatus, the MAC control circuitry performs sector level sweep (SLS) or a beam refinement protocol (BRP), and controls antenna directivity training for the transmission antenna and the reception antenna with respect to the another communication apparatus.

7. The communication method according to claim 6, wherein, when the MAC control circuitry determines to perform the data communication based on a personal basic service set (PBSS) between the communication apparatus and the another communication apparatus, the MAC control circuitry controls the antenna directivity training for the transmission antenna and the reception antenna with respect to the another communication apparatus.

8. The communication method according to claim 5, wherein the second OCB response subfield is set to 1 to indicate the OCB is enabled.

* * * * *